United States Patent
Bozdagi et al.

(10) Patent No.: US 6,594,403 B1
(45) Date of Patent: Jul. 15, 2003

(54) SYSTEMS AND METHODS FOR REGISTERING SCANNED DOCUMENTS

(75) Inventors: Gozde Bozdagi, Ankara (TR); Steven J. Harrington, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/239,296

(22) Filed: Jan. 29, 1999

(51) Int. Cl.⁷ .............. G06K 9/36; H04N 1/387
(52) U.S. Cl. .......... 382/284; 382/276; 382/305; 358/450
(58) Field of Search .................. 382/284, 266, 382/262, 276, 289, 295, 296, 305, 312, 275, 268, 269, 260, 264; 358/450, 540, 461; 707/2, 5; 327/551

(56) References Cited

U.S. PATENT DOCUMENTS

| | | | |
|---|---|---|---|
| 4,393,410 A | * 7/1983 | Ridge et al. | 358/285 |
| 4,945,502 A | * 7/1990 | Kwon et al. | 382/275 |
| 5,339,170 A | * 8/1994 | Fan | 358/461 |
| 5,557,684 A | * 9/1996 | Wang et al. | 382/107 |
| 5,706,416 A | * 1/1998 | Mann et al. | 345/427 |
| 5,784,115 A | 7/1998 | Bozgadi | 348/452 |
| 5,819,258 A | * 10/1998 | Vaithyanathan et al. | 707/2 |
| 5,838,837 A | * 11/1998 | Hirosawa et al. | 382/284 |
| 5,917,962 A | * 6/1999 | Chen et al. | 382/291 |
| 5,926,575 A | * 7/1999 | Fukase et al. | 382/266 |
| 5,999,927 A | * 12/1999 | Tukey et al. | 707/5 |
| 6,002,492 A | * 12/1999 | Kamon et al. | 358/450 |
| 6,011,430 A | * 1/2000 | Kim | 327/551 |

OTHER PUBLICATIONS

"A Survey of Image Registration Techniques", L. G. Brown, ACM Computing Surveys, vol. 24, No. 4, Dec. 1992.
"Video Mosaics for Virtual Environments", R. Szeliski, IEEE Computer Graphics and Applications, pp. 22–30, Mar. 1996.
"Salient Video Stills: Content and Context Preserved", L. Teodosio et al., ACM Multimedia, pp 39–46, 1993.
"A Nonlinear Variational Problem for Image Matching", Y. Amit, SIAM J. Sci. Comput., vol. 15, No. 1 pp. 207–224, Jan. 1994.

* cited by examiner

*Primary Examiner*—Bhavesh Mehta
*Assistant Examiner*—Kanji Patel
(74) *Attorney, Agent, or Firm*—Oliff & Berridge, PLC

(57) ABSTRACT

The scanned image registration systems and methods according to this invention register sets of scanned subimages of an original document into a composite scanned image of the original document. The subimages are formed by scanning portions of the original document on a scanner having a scan area, or window or footprint, that is smaller than the size of the document. An appropriate set of affine parameters, or more generally, transformation parameters, is obtained for each subimage relative to a fixed coordinate system. The set of affine parameters for each subimage defines the rotational and translational deformation necessary to place that subimage into the fixed coordinate system. The fixed coordinate system is preferably defined by selecting one of the subimages as a base image. The other images are then warped into registration with the selected base subimage based on the determined affine parameters. The base subimage and the warped other subimages are then combined to form the composite image of the original document. In particular, spatial averaging can be used to combine the base and warped subimages. Large format documents can thus be scanned using small window or footprint scanners.

35 Claims, 20 Drawing Sheets

SYSTEMS AND METHODS FOR REGISTERING SCANNED DOCUMENTS

BACKGROUND OF THE INVENTION

1. Field of Invention

This invention relates to image processing. More particularly, this invention is directed to registering partial image portions obtained from a scanner into a single larger image.

2. Description of Related Art

Image scanning has assumed increased importance for applications such as desktop publishing, image processing and World Wide Web publication. Currently, image scanning is generally done using either high-end drum scanners or low-end flatbed scanners. Drum scanners have higher pixel resolutions than flatbed scanners. Drum scanners are also able to scan large-sized original documents. However, drum scanners are more expensive than flatbed scanners, particularly as inexpensive CCD imagers, and in the future, light-sensitive CMOS sensing elements, are incorporated into flatbed scanners.

Moreover, drum scanners are not able to scan large-size original documents that are too rigid to adhere to the curved drum. Flatbed scanners are compact, but typically have a relatively small platen size. Scanners in general, and flatbed scanners in particular, must therefore register partially scanned images to each other to assemble and complete large images.

Different techniques are available in the art usable to establish correspondence between partial image portions, depending on the application and the type of deformation between image portions. "A Survey Of Image Registration Techniques," L. G. Brown, ACM Computing Surveys, vol. 24, no. 4, December 1992, pp. 325–376, (hereinafter "Brown") incorporated herein by reference in its entirety, provides a general overview of image-registration imaging. "A Contour Based Approach To Multi-Sensor Image Registration," H. Li, et al., (hereinafter "Li") IEEE Trans. Image Processing Vol. 4, March 1995, pp. 320–334; "MRI-PET Registration with Automated Algorithm," R. P. Woods, et al. (hereinafter "Woods"), Journal of Computer Assisted Topography, vol. 17, 1993, pp. 536–546, "Video Mosaics for Virtual Environments," R. Szeliski, (hereinafter "Szeliski") IEEE Computer Graphics and Applications, March 1996, pp. 20–30, and "Salient Video Stills: Content and Context Preserved," by L. Teodosia et al. (hereinafter "Teodosia"), ACM Multimedia, 1993, pp. 39–46, each of which is incorporated herein by reference, in its entirety, discuss telereality applications and still video representation.

SUMMARY OF THE INVENTION

In image registration, a spatial transform between images under consideration generally needs to be found to allow the misalignment between partial images caused during scanning to be removed. The misalignment represents the translation and rotation between images (global transformation) and local deformations within each partial image (local transformation). Matched filtering techniques can be used to find the spatial transformation. Several matched filtering techniques are described in Brown. In these methods, the spatial transform is considered to be a pure translation. The major disadvantage of these techniques is their computational complexity.

Another known method for image registration is to use wavelet analysis to model the spatial transformation. This is proposed, for example, in "A Nonlinear Variational Problem for Image Matching," Y. Amit, SIAM Journal Sci. Comput., vol. 15, no. 1, January 1994, pp. 207–224, incorporated herein by reference in its entirety. Yet another approach is to estimate the spatial transformation from the phase of a wavelet decomposition of images, as described in "Motion Estimation Using Complex Wavelets," J. Magarey et al., Technical Report, Cambridge University, Dept. of Engineering, 1995, incorporated herein by reference in its entirety. The basic disadvantage of these techniques is that they model local transformations instead of global ones, which are the dominant transformation for scanning purposes.

"Accurate Mosaiking of Scanned Maps, or How to Generate a Virtual A0 Scanner," J. van Katwijk et al., Proc. Of the First Annual Conf. of the Advanced School for Computing and Imaging, The Netherlands, May 1995, pp. 353–359, incorporated herein by reference it its entirety, proposes another image registration technique for registering partial images of scanned documents. With this method, scanned utility maps can be converted to structural descriptions. As a deformation model, affine transformation, which is robust for estimating global transformations, is used. However, the regions on which the transformation is estimated are pre-drawn on the images, requiring manual intervention.

This invention provides systems and methods for estimating the global transformation between scanned partial images of an original document to reconstruct a scanned image of the original document.

This invention separately provides systems and methods that determine the global transformation using a transformation.

This invention separately provides systems and methods that determine the global transformation using an affine transformation.

This invention separately provides systems and methods that divide each partial image into non-overlapping blocks and that estimate the global transformation for each block.

This invention separately provides systems and methods that cluster the estimated block parameters to find the actual transformation for the overall partial images.

These and other features and advantages of this invention are described in or are apparent form the following detailed description of the preferred embodiments.

BRIEF DESCRIPTION OF THE DRAWINGS

The preferred embodiments of this invention will be described, with reference to the following figures, wherein:

FIG. 13 shows an original document that is larger in two dimensions than the scanner window, showing a scanning order usable with the first exemplary embodiment of the image affine parameters determining step of FIG. 6;

FIG. 14 shows the original document of FIG. 13, showing a scanning order that is usable with the second and third exemplary embodiments of the image affine parameters determining step of FIG. 6;

FIG. 15 shows the original document of FIG. 13, showing a scanning order usable with the second and third exemplary embodiments of the image affine parameters determining step of FIG. 6;

DETAILED DESCRIPTION OF PREFERRED EMBODIMENTS

Figure 1:
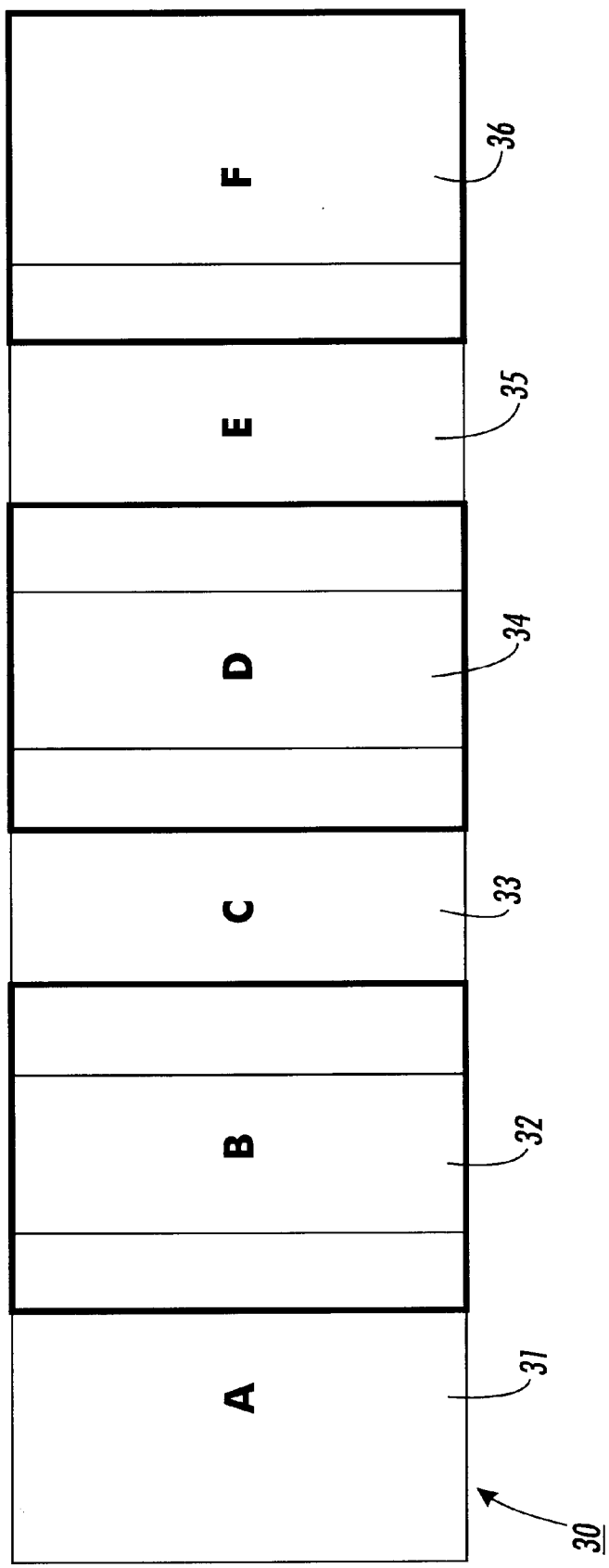
FIG. 1 shows an exemplary large document and the scanned subimages obtained from that original document.

Image registration refers to establishing correspondences between overlapping images. Image registration is widely used in the areas of satellite imaging as set forth in Li above, registering together adjacent tomographic brain images, as set forth in Woods above, in telereality applications as set forth in Szeliski, and in still video images, as set forth in Teodosia above. In the systems and methods according to this invention, as will be described in greater detail below, partial images, or subimages, are obtained by scanning a source document that is larger than the scanning window of the scanning device used to obtain the partial images or subimages. The scanned source document can contain image regions, graphics regions, text regions or any other type of image data region.

According to this invention, appropriate global transformations are obtained for each of the partial images, or subimages. The global transformations are used to register each of the partial images, or subimages, to a reference coordinate system. It should be appreciated that the reference coordinate system can be defined by a first one of the scanned partial images.

The subimages, or partial images, are registered by warping the subimages to the reference coordinate system. Once all of the subimages, or partial images, are registered to the coordinate system, spatial averaging is used to combine the subimages into the scanned composite image of the original document. Accordingly, based on the systems and methods set forth below, a user can scan a document larger than the scanning window of the scanning device using low-cost flatbed and scanners or other low-cost hand held scanners.

In particular, according to the systems and methods of this invention, estimates are used to find the appropriate transformation between each scanned partial image. These estimates allow translation and/or uniform scaling between the various partial images. The estimates made according to the systems and methods of this invention estimate both the translation and the rotation between the scanned partial images of the original document to construct the scanned composite image of the original document. U.S. Pat. No. 5,784,115 to Gozde Bozdagi, incorporated herein by reference in its entirety, provides systems and methods for motion-compensated de-interlacing of interlaced video frames to generate high-quality progressive video frames. The systems and methods disclosed in the 115 patent also keep the computational complexity low and require only two fields, i.e., a single frame.

As disclosed in the 115 patent, the systems and method of the 115 patent determine if global motion is present in the single image frame formed by two temporally offset fields. If global motion is detected, the global motion is estimated and compensated for. The globally-compensated images are analyzed to determine whether local motion is present. If local motion is detected, the pixels affected by the local motion are interpolated using motion-adaptive techniques. If global motion is detected, the global motion is estimated using optical flow analysis and affine parametrization.

As set forth in the 115 patent, each of the fields is divided into a plurality of discrete blocks, and the affine parameters are estimated for each of the blocks of one of the fields relative to the corresponding block of the other field. If global motion is a dominant motion within the single image frame, the respective values of the estimated affine parameters for each of the block tends to cluster around the value representing the global motion. The affine parameter values at the center of the cluster with the most members are chosen as a final estimate of the affine parameters for the global motion. The global motion is compensated by warping one of the two interlaced fields using the chosen affine parameters.

Local motion is determined in the single resulting frame by determining a motion map between the warped one of the two fields and the other one of the two fields. As disclosed in the 115 patent, the pixels falling within the second motion map, i.e., the pixels affected by the local motion, are compensated for using edge-adaptive interpolation.

FIG. 1 illustrates an original document 30 that is longer than the scanning bed, or scanning window or scanner footprint, of a flatbed scanner to be used to scan the original document 30. As shown in FIG. 1, the original document 30 is longer than the scanning window or scanner footprint in one dimension, but is not longer than the scanning window or scanner footprint in a second, orthogonal, direction. Thus, as shown in FIG. 1, the original document 30 can be scanned to form six independent subimages 31–36. In particular, a first subimage 31 is obtained by scanning the leftmost portion of the original document 30. Then, a second subimage 32 is obtained by scanning a portion of the original document 30 that is to the right of, but that slightly overlaps, the first subimage 31. The additional subimages 33–35 are scanned, each slightly overlapping the rightmost portion of the previous scanned subimage, until the entire original document 30 has been scanned. As shown in FIG. 1, each of the subimages 31–36 is also marked with the reference letters A–F, respectively.

Figure 2:
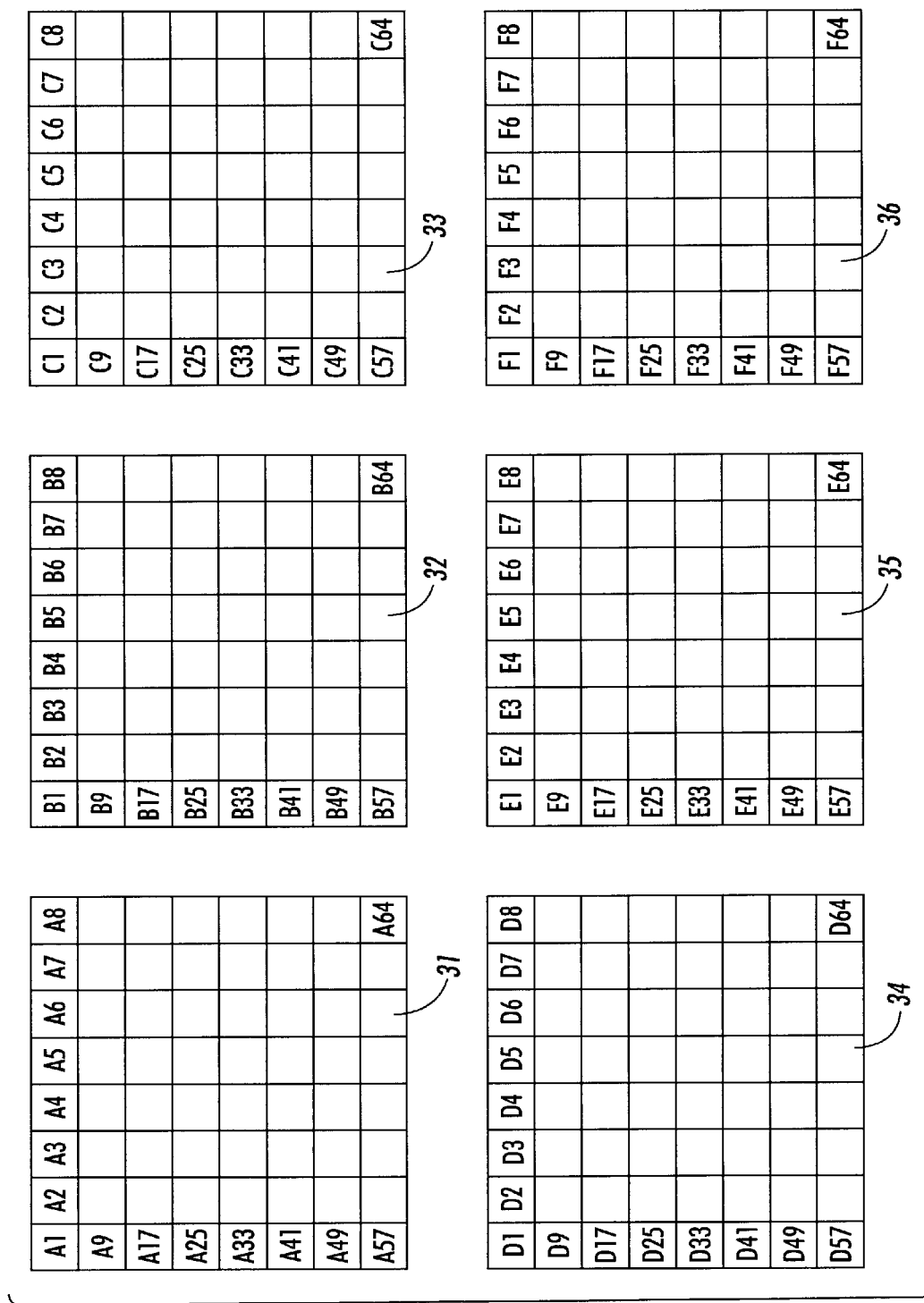
FIG. 2 shows the six subimages obtained from the original document shown in FIG. 1 after dividing them into blocks.

FIG. 2 shows the resulting six subimages 31–36 after they are divided into blocks according to the systems and methods of this invention. For example, as shown in FIG. 2, each of the subimages 31–36 is divided into 64 blocks. Each block will contain the same number of pixels. It should also be appreciated that the subimages 31–36 can be divided into any number of blocks, where each block contains a fixed number of pixels. Thus, the 64 blocks shown in FIG. 2 should be understood as illustrative, not limiting.

It should also be appreciated that, as illustrated in FIG. 2, when the subimages 31–36 are formed by scanning the original document 30, there is no inherent relationship between any two of the subimages 31–36, nor is there any inherent amount of overlap between any two of the images 31–36.

The following descriptions of the exemplary embodiments of the scanned image registration systems and methods according to this invention are described relative to affine transformation for ease of understanding. However, it should be appreciated that any known or later-developed transformation that will allow subimages to be compiled into a single image can be used with the systems and methods of this invention. One such other transformation is a perspective transformation. Thus, the following descriptions and claims should not be interpreted as being limited to affine transformations.

Figure 3:
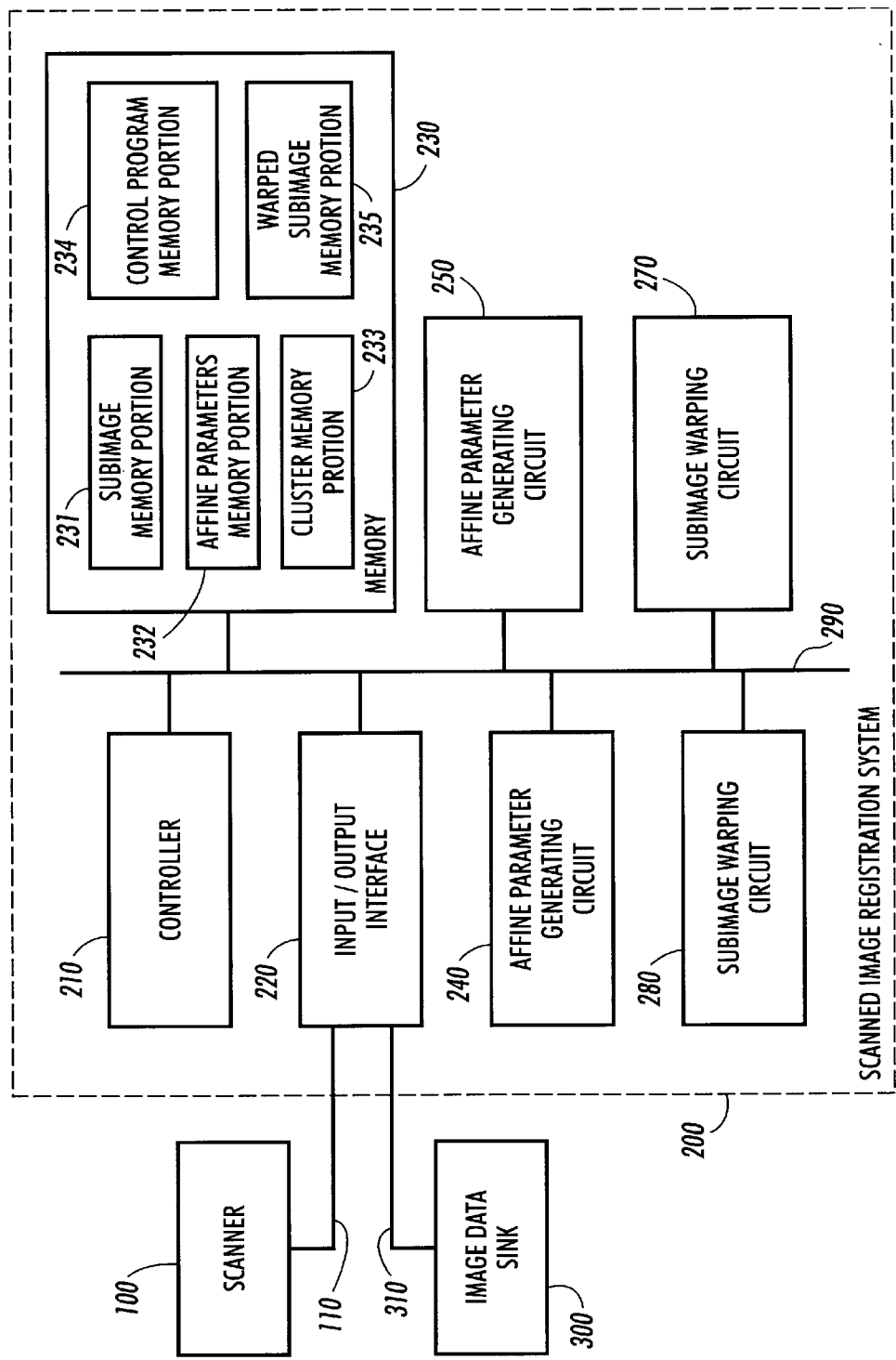
FIG. 3 is a block diagram outlining one exemplary embodiment of a scanned image registration system according to this invention.

FIG. 3 shows one exemplary embodiment of a scanned image registration system 200 according to this invention. As shown in FIG. 3, a scanner 100 is connected to the scanned image registration system 200 over a link 110. Similarly, an image data sink 300 can be connected to the scanned image registration system 200 over a link 310.

It should be appreciated that the scanner 100 can be any known or later developed type of scanner. There is no restriction on the form the scanner 100 can take. However, when the scanner 100 is used in conjunction with the scanned image registration system 200 of this invention, the assumption is the scanner 100 is unable to fully scan an entire original document.

The link 110 can be any known or later developed device or system for connecting the scanner 100 to the scanned image registration system, including a direct cable connection, a connection over a wide area network or a local area network, a connection over an intranet, a connection over the Internet, or a connection over any other distributed processing network or system. In general, the link 110 can be any known or later developed connection system or structure usable to connect the scanner 100 to the scanned image registration system 200.

The image data sink 300 can be any known or later developed device that can receive the reconstructed composite image from the scanned image registration system 200. Thus, the image data sink 300 can be a display, an image output terminal such as a laser printer, a digital copier, an inkjet printer, a dot matrix printer, a dye sublimation printer, or the like. The image data sink 300 can also be any known or later developed storage device, such as a floppy disk and drive, a hard disk and drive, a writeable CD-ROM or DVD disk and drive, flash memory, or the like. It should also be appreciated that the image data sink 300 can be located locally to the scanned image registration system 200 or can be located remotely from the scanned image registration system 200. Thus, like the link 110, the link 310 can be any known or later developed connection system or structure usable to connect the scanned image registration 200 to the image data sink 300. Specifically, the link 310 can be implemented using any of the devices or systems described above with respect to the link 110.

The scanned image registration system 200 includes a controller 210, an input/output interface 220, a memory 230, a subimage blocking circuit 240, an affine parameter generating circuit 250, a subimage warping circuit 270, and a subimage combining circuit 280, all interconnected over a data and/or control signal bus 290. In addition, the scanner 200 and the image sink 300 are connected over the links 110 and 310, respectively, to the input/output interface 220.

As shown in FIG. 3, the memory 230 includes a subimage memory portion 231, an affine parameters memory portion 232, a cluster memory portion 233, a control program memory portion 234, and a warped subimage memory portion 235. The subimage memory portion 231 stores the various subimages obtained from the original document using the scanner 100 and transmitted to the scanned image registration system 200 over the link 110 and through the input/output interface 220. The affine parameters memory portion 232 stores the various affine parameters generated for each of the subimages, other than a base subimage (if any), that are stored in the subimage memory portion 231, as described below.

The cluster memory portion 233 stores the cluster data generated during clustering the sets of block affine parameters that were generated for the blocks of the non-base subimages. The warped subimage memory portion 235 stores the subimages after they have been warped to place them into registration with the base subimage or a predetermined reference position.

The control program memory portion 234 stores any control programs of the scanned image registration system 200. In particular, the scanned image registration system 200 is preferably implemented using a programmed general purpose computer, microprocessor or microcontroller. Thus, the control program memory portion 234 stores the control programs to be executed by the controller 210 to implement the systems and methods of this invention.

As indicated above, the input/output interface 220, under control of the controller 210, inputs the subimages from the scanner 100 and stores them to the subimage memory portion 231. The input/output interface 220, also under control of the controller 210, can output the reconstructed composite image from the subimage combining circuit 280 or the memory 230 to the image data sink 300 over the signal line 310.

The subimage blocking circuit 240, under control of the controller 210, inputs each of the subimages either directly from the input/output interface 220 or the subimage memory portion 231 and divides each subimage into an equal number of blocks having an equal numbers of pixels in each block. The blocked subimages are then stored in the subimage memory portion 231 or directly output to the affine parameters generating circuit 250.

The affine parameter generating circuit 250, under control of the controller 210, inputs two of the block subimages from the subimage memory portion 231, the warped subimage memory portion 235, and/or the subimage blocking circuit 240 and generates the image affine parameters necessary to warp one of the two images into registration with the other of the two images and/or into registration with the base subimage. These image affine parameters are then stored in the affine parameters memory portion 232.

The subimage warping circuit 270 inputs an unwarped subimage (if any) from the subimage memory portion 231 and the corresponding image affine parameters for that subimage stored in the affine parameters memory portion 232. The subimage warping circuit 270 then warps the input subimage using the input image affine parameters to place it into registration with the base subimage. The warped subimage is then stored in the warped subimage memory portion 235.

The subimage combining circuit 280 inputs the base subimage from the subimage memory portion 231 and the warped non-base subimages stored in the warped subimage memory portion 235 and combines them to form a reconstructed composite image of the original document. This reconstructed composite image can then be stored in the memory 230 or output directly to the image data sink 300 through the input/output interface 220, as indicated above.

It should be appreciated, as indicated above, that the affine parameter generating circuit 250 shown in FIG. 3 can be more generally described as a transformation parameter generating circuit 250 that generates the particular transformation parameters for the particular transformation being used. Likewise, the affine parameters memory portion 232 shown in FIG. 3 can be more generally described as a transformation parameters memory portion 232 that stores the transformation parameters generated by the transformation parameter generating circuit 250. In this case, the subimage warping circuit 270 then warps the input subimage, using the input image transformation parameters stored in the transformation parameters memory portion 232 and generated by the transformation parameter generating circuit 250, to place it into registration with the base subimage.

Figure 4:
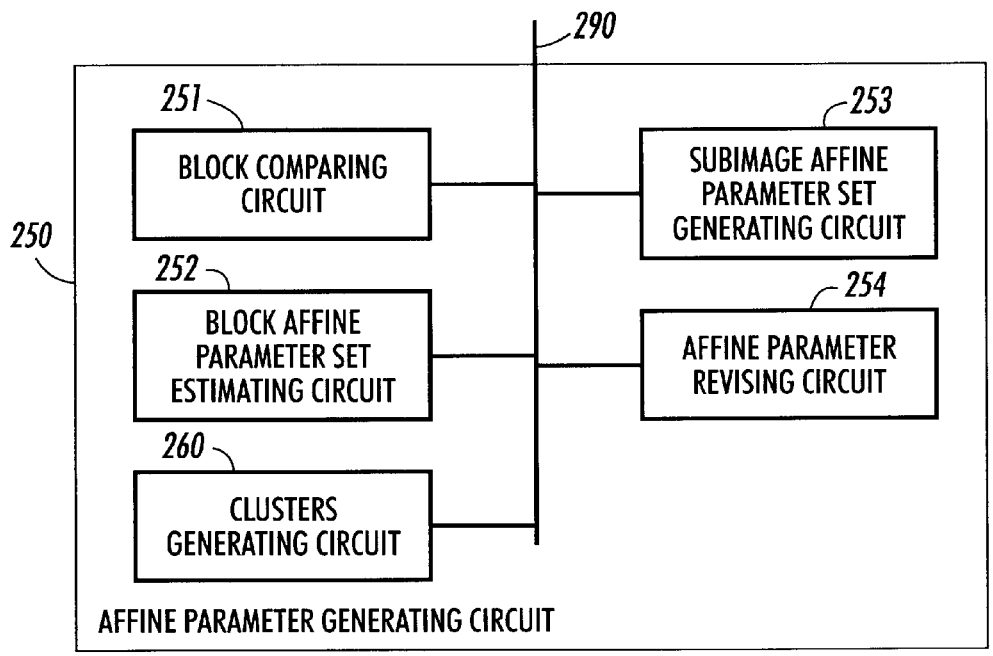
FIG. 4 is a block diagram outlining one exemplary embodiment of the affine parameter generating circuit of FIG. 3.

FIG. 4 shows in greater detail one exemplary embodiment of the affine parameter generating circuit 250. As shown in FIG. 4, the affine parameter generating circuit 250 includes a block comparing circuit 251, a block affine parameter set estimating circuit 252, a subimage affine parameter set generating circuit 253, an affine parameter revising circuit 254, and a clusters generating circuit 260. After the affine parameter generating circuit 250 inputs two subimages, such as the base subimage and a subimage to be warped that overlaps the base image, the block comparing circuit 251 compares each block of the subimage to be warped to one or more blocks of the other subimage. For example, if the two subimages include the base subimage, for each pair of blocks in the base image and the subimage to be warped, each pixel in one block is compared to a correspondingly positioned pixel in the other block.

Once all of the pixels in one of the two blocks are compared to the corresponding pixels in the other block, the results of the comparison are output from the block comparing circuit 251 to the block affine parameter set estimating circuit 252. The block affine parameter set estimating circuit 252 estimates a set of block affine parameters that define the vertical and horizontal translational components and vertical and horizontal components of any rotation that best convert the image values of the pixels in one block to the image values of the pixels in the other block. In particular, the block affine parameter set estimating circuit estimates the affine parameters as set forth in the 115 patent, and further described in detail below. It should be appreciated that one block affine parameter set is generated by the block comparing circuit 251 for each pair of compared blocks.

The estimated block parameter sets are then output by the block affine parameter set estimating circuit 252 to the clusters generating circuit 260. The clusters generating circuit 260 plots the estimated block affine parameters for the compared blocks of the two subimages in an n-dimensional space, where n is normally six, but could be higher or as low as three. The clusters generating circuit 260 also determines which cluster of plotted block affine parameter sets has the most members. This cluster of block affine parameter sets is then output by the cluster generating circuit 260 to the subimage affine parameter set generating circuit 253. It should be appreciated that a six-dimensional space can be used because the images are on a planar surface, and six parameters are sufficient to define all possible deformations of such a planar surface. These six parameters define the horizontal and vertical translations and the sine and cosine values of any rotation. It should further be appreciated that only three parameters could be used, because three parameters are sufficient to describe all possible deformations when using a scanner to generate the subimages according to this invention. These three parameters define the horizontal and vertical translations and the angle of any rotation.

The subimage affine parameter set generating circuit 253 then analyzes the block affine parameter sets forming the cluster identified by the clusters generating circuit 260 to determine an overall image affine parameter set that defines the translational and rotational parameters that, when applied to the pixel values of all of the blocks of one of the subimages, most closely results in the pixels values of the corresponding pixels of the corresponding blocks in the other subimage. Once the subimage affine parameter set generating circuit 253 determines this set of image affine parameters for the subimage to be warped, those image affine parameters are output to the affine parameter revising circuit 254.

The affine parameter revising circuit 254 then inputs the stored image affine parameters for the other subimage, i.e., the subimage used to determine the image affine parameters for the subimage to be warped. The affine parameter revising circuit 254 then revises the image affine parameters determined for the subimage to be warped based on the image affine parameters for the other subimage, so that the subimage to be warped now has image affine parameters that will warp it into registration with the base subimage, if any, or a predetermined reference position. Of course, it should be understood that, if the other subimage is the base image, the image affine parameters for the subimage to be warped will not actually be modified.

It should be appreciated, as indicated above, that the block affine parameter set estimating circuit 252 shown in FIG. 4 can be more generally described as a block transformation parameter set estimating circuit 252 that generates the particular block transformation parameters for the particular transformation being used. Likewise, the subimage affine parameter set generating circuit 253 shown in FIG. 4 can be more generally described as a subimage transformation parameter set generating circuit 253 that generates the particular subimage transformation parameters from the block transformation parameter sets. Similarly, the affine parameter revising circuit 254 shown in FIG. 4 can be more generally described as a transformation parameter revising circuit 254 that revises the image transformation parameters determined for the subimage to be warped based on the image transformation parameters for the other subimage.

Figure 5:
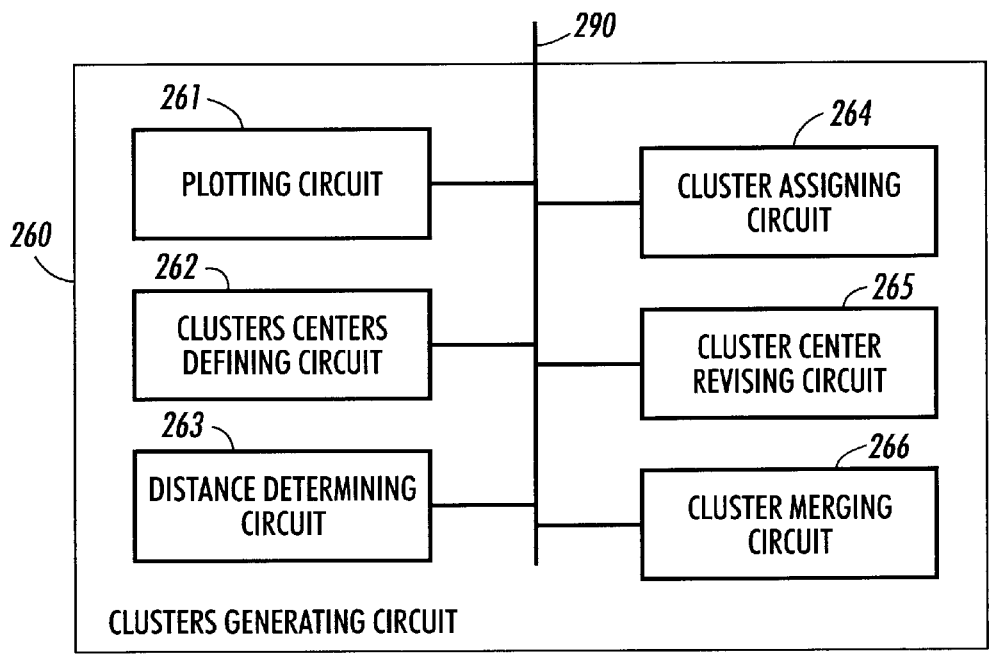
FIG. 5 is a block diagram outlining one exemplary embodiment of the clusters generating the circuit of FIG. 4.

FIG. 5 shows in greater detail one exemplary embodiment of the clusters generating circuit 260. In particular, as shown in FIG. 5, the clusters generating circuit 260 includes a plotting circuit 261, a clusters centers defining circuit 262, a distance determining circuit 263, a cluster assigning circuit 264, a cluster center revising circuit 265 and a cluster merging circuit 266. When the clusters generating circuit 260 receives each block affine parameter set output by the block affine parameter set estimating circuit 252, that block affine parameter set is first input to the plotting circuit 261, which plots that block affine parameter set in a six-dimensional space, or possibly a three-dimensional space. When the block affine parameter set plotted by the plotting circuit 261 is the first block affine parameter set for a new pair of subimages, the cluster centers defining circuit 262 defines that first plotted block affine parameter set as a first cluster center in the six-dimensional space, or possibly the three-dimensional space. The cluster centers defining circuit 262 then defines an additional (k−1) cluster centers relative to the first cluster center as described in the 115 patent, for a total of k cluster centers. In general, the (k−1) additional cluster centers are defined relative to the plotted first cluster center so that the initial k cluster centers are generally evenly distributed throughout the image. In general, this is guaranteed by using a distance threshold such that the next cluster center is at a distance from the previously-defined cluster centers equal to the distance threshold. This ensures that at least one cluster center is from the overlapping area.

It should also be understood that the cluster centers defining circuit 262 could instead wait until all of the block affine parameter sets output by the block affine parameter set estimating circuit 252 are plotted by the plotting circuit 261 before the cluster centers are defined. In this case, the cluster centers defining circuit 262 would define the first cluster center as any one of the plotted block affine parameter sets. The other cluster centers would then be determined in the same way relative to this selected block affine parameter set.

Once all of the block affine parameter sets output by the block affine parameter set estimating circuit 252 are plotted by the plotting circuit 261 and the cluster centers have been defined by the cluster center defining circuit 262, the distance determining circuit 263 determines a distance between each cluster center and each plotted block affine parameter set. The cluster assigning circuit 264 then assigns each of the plotted block affine parameter sets to one of the clusters based on the distances determined by the distance determining circuit 263. It should also be appreciated that the distance determining circuit 263 and the cluster assigning circuit 264 could alternatively determine the distances for each block affine parameter set and assign that block affine parameter set to a cluster as it is plotted by the plotting circuit 261.

Once all of the block affine parameter sets are plotted and assigned to a cluster, the cluster center revising circuit 265 looks at all of the block affine parameter sets assigned to each particular cluster. Based on the block affine parameter sets assigned to that cluster, the cluster center revising circuit 265 revises the cluster center for that cluster. Then, the cluster merging circuit 266 determines if the cluster centers for any two clusters are too close to each other. If so, the cluster emerging circuit 266 merges those two clusters into a single larger cluster. This single larger cluster is then output back to the cluster center revising circuit 265 to have its cluster center further revised.

It should be appreciated, as indicated above, that the clusters generating circuit 260 shown in FIG. 5 will more generally generate clusters based on the block transformation parameter sets generated by the block transformation parameter set estimating circuit 252.

In operation, when the scanned image registration system 200 receives the subimages from the scanner 100, such as the subimages 31–36, they are stored in the memory 230. The subimage blocking circuit 240 then blocks each of the subimages, as shown in FIG. 2. Once the subimages are blocked and re-stored, one of the subimages is identified as the base subimage. All the other subimages will ultimately be warped into registration with this base subimage. For ease of processing, the scanned image registration system 200 will normally treat the first scanned subimage as the base subimage. However, the scanned image registration system 200 could alternatively receive an input from the scanner 100 or an operator of the scanned image registration system 200 that identifies a particular one of the scanned subimages as the base subimage.

Once all of the subimages are input and divided into blocks, and the base subimage is identified or selected, the base subimage and one of the other subimages are output to the affine parameter generating circuit to determine the image affine parameters which will warp the pixel values of the other subimage into registration with the pixels values of the base subimage. In particular, for ease of processing, the warped subimages are compared to each other in their scanning order. Thus, for the original image 30 shown in FIG. 1, the first subimage 31 becomes the base subimage. The base subimage 31 and the second subimage 32 are then output to the affine parameter generating circuit 250 to generate the image affine parameters that will warp the second subimage 32 into registration with the first or base subimage 31. Then, the third subimage 33 is output to the affine parameter generating circuit 250, where the image affine parameters that will warp the third subimage 33 into registration with the second subimage 32 are determined. The fourth subimage 34 is then output to the affine parameter generating circuit 250, where the image affine parameters that will warp the fourth subimage 34 into registration with the third subimage 33 are determined. This continues until all of the subimages 31–36 input and warped.

From the above-described operation of the scanned image registration system 200, it is apparent that the subimages must be scanned in a particular order such that each subimage sufficiently overlaps the immediately preceding subimage so that an appropriate set of image affine parameters can be generated that will warp the current subimage into registration with the immediately preceding subimage. This scanning order is shown, for example, in FIG. 13.

However, the scanned image registration system 200 is not limited to this scanning order. Rather, this scanning order, while placing the largest burden on the user to scan the subimages in the appropriate order, minimizes the computational load on the affine parameter generating circuit 250, thus allowing the scanned image registration system 200 to more rapidly reconstruct the composite image of the original image.

Alternatively, a different scanning order, which relaxes the burden on the user in scanning the original document but which increases the computational load on the affine parameter generating circuit 250, could instead be used. In this second scanning scheme, the subimages do not have to be scanned in any particular order. Instead, the user is required to indicate, upon scanning each subimage, which previously scanned subimage should be used by the affine parameter generating circuit 250 to generate the image affine parameter set for the currently scanned subimage. In this case, while the scanning order is not fixed, the scanned image registration system 200 does need to explicitly know which other previously scanned subimage a particular subimage to be warped should be warped into registration with. One such scanning order is shown, for example, in FIG. 14.

Figures 13, 14, 15:
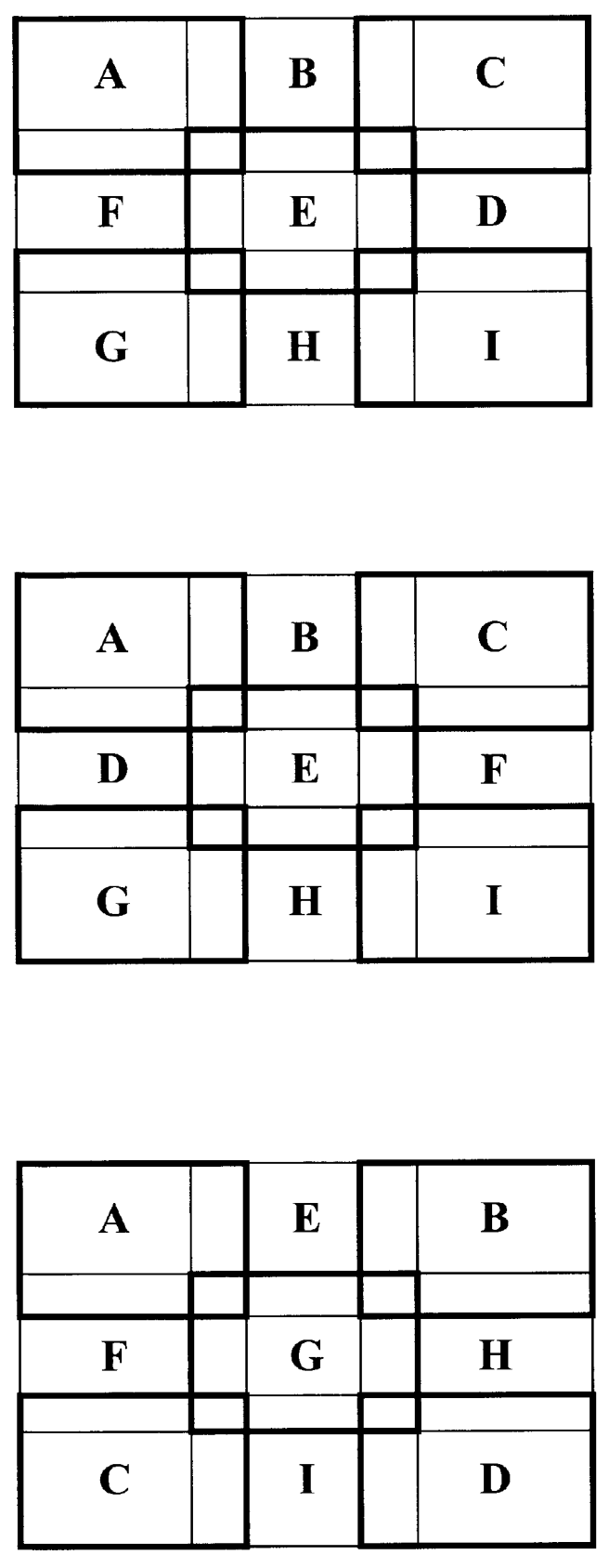

Furthermore, a third scanning order could be used. This third scanning scheme maximally reduces the burden on the user, but maximally increases the computational load on the affine parameter generating circuit 250. In this third scanning scheme, as shown in FIG. 15, the subimages do not have to be scanned in any particular order. In particular, the subimages do not have to be scanned such that any subsequent subimage is required to overlap at least one of the previously scanned subimages, as in the scanning orders shown in FIGS. 13 and 14. Rather, as shown in FIG. 15, while all of the scanned subimages must eventually mutually overlap one or more of the other scanned subimages, a subsequently scanned subimage does not need to overlap a previously scanned subimage.

In this third scanning scheme, the affine parameter generating circuit 250 would need to compare all of the unwarped subimages to any particular selected one of the previously warped subimages, or the base subimage, to determine which subimage or subimages sufficiently overlap the selected base or previously warped subimage such that a sufficient set of image affine parameters between the selected subimage and each overlapping subimage can be generated. In effect, this requires that, as each warped subimage or the base image is selected, it must be compared, and a subimage affine parameter set generated, for each of the unwarped subimages. Then, the generated subimage affine parameter sets must be reviewed to determine which subimage affine parameter set actually reflects an overlap between the corresponding unwarped subimage and the selected warped or base subimage.

Regardless of how the subimages to be compared are selected, and the number of subimages to be compared, the block comparing circuit 251 compares each block of one of the subimages to the correspondingly positioned block in the other one of the subimages. Thus, referring to subimages 31 and 32 of FIG. 2, the A1 block of the first subimage 31 is compared to the B1 block of the second subimage 32. Similarly, the A2–A64 blocks of the first subimage are compared to the B2–B64 blocks, respectively, of the second subimage 32. It should be appreciated that this method for comparing the blocks of one subimage to the blocks of the next subimage will generate proper block affine parameters only when the amount of translation is small. When the amount of translation is too large, one of the following alternative methods for comparing the blocks should be used.

In a first alternative method, although this first alternative method increases the computational load on the block comparing circuit 251, the block affine parameter set estimating circuit 252 and the clusters generating circuit 260, each of the blocks A1–A64 could be compared to each of the blocks B1–B64. Thus, there would be 64 sets of pixel-by-pixel comparison values for each of the blocks A1–A64. As a result, 64 sets of block affine parameters would be generated for each one of the blocks A1–A64. While this squares the number of comparison operations and the number of block affine parameter set estimating operations, this also significantly, but not proportionally, increases the accuracy of the subimage affine parameter generation. Thus, it should be understood that either one of these comparing schemes could be used, depending on the required accuracy and the available computational resources.

In a second alternative method that combines the ability of the first alternative method to deal with large translations and the ability of the first method to minimize the computational load on the block comparing circuit 251, the block affine parameter set estimating circuit 252 and the clusters generating circuit 260, only a small, selected subset of the blocks A1–A64 could be compared to each of the blocks B1–B64. In general, the selected subset of the blocks A1–A64 would be those blocks that lie on the boundary of the subimage. The selected subset of blocks is thus ensured of containing some of the overlapping blocks.

There would be 64 sets of pixel-by-pixel comparison values for each of the blocks of the selected subset. As a result, 64 sets of block affine parameters would be generated for each one of the blocks of the selected subset. These set of block affine parameters are clustered to identify which of the blocks B1–B64 most closely matches each of the blocks of the selected subset. This allows a more appropriate one-to-one comparison of the blocks A1–A64 to the blocks B1–B64 based on the identified ones of the blocks B1–B64 that match the blocks of the small selected subset.

It should be understood that each of the circuits shown in FIGS. 3–5 can be implemented as portions of a suitably programmed general purpose computer. Alternatively, each of the circuits shown in FIGS. 3–5 can be implemented as physically distinct hardware circuits within an ASIC, or using a FPGA, a PDL, a PLA or a PAL, or using discrete logic elements or discrete circuit elements. The particular form each of the circuits shown in FIGS. 3–5 will take is a design choice and will be obvious and predicable to those skilled in the art.

Figure 21:
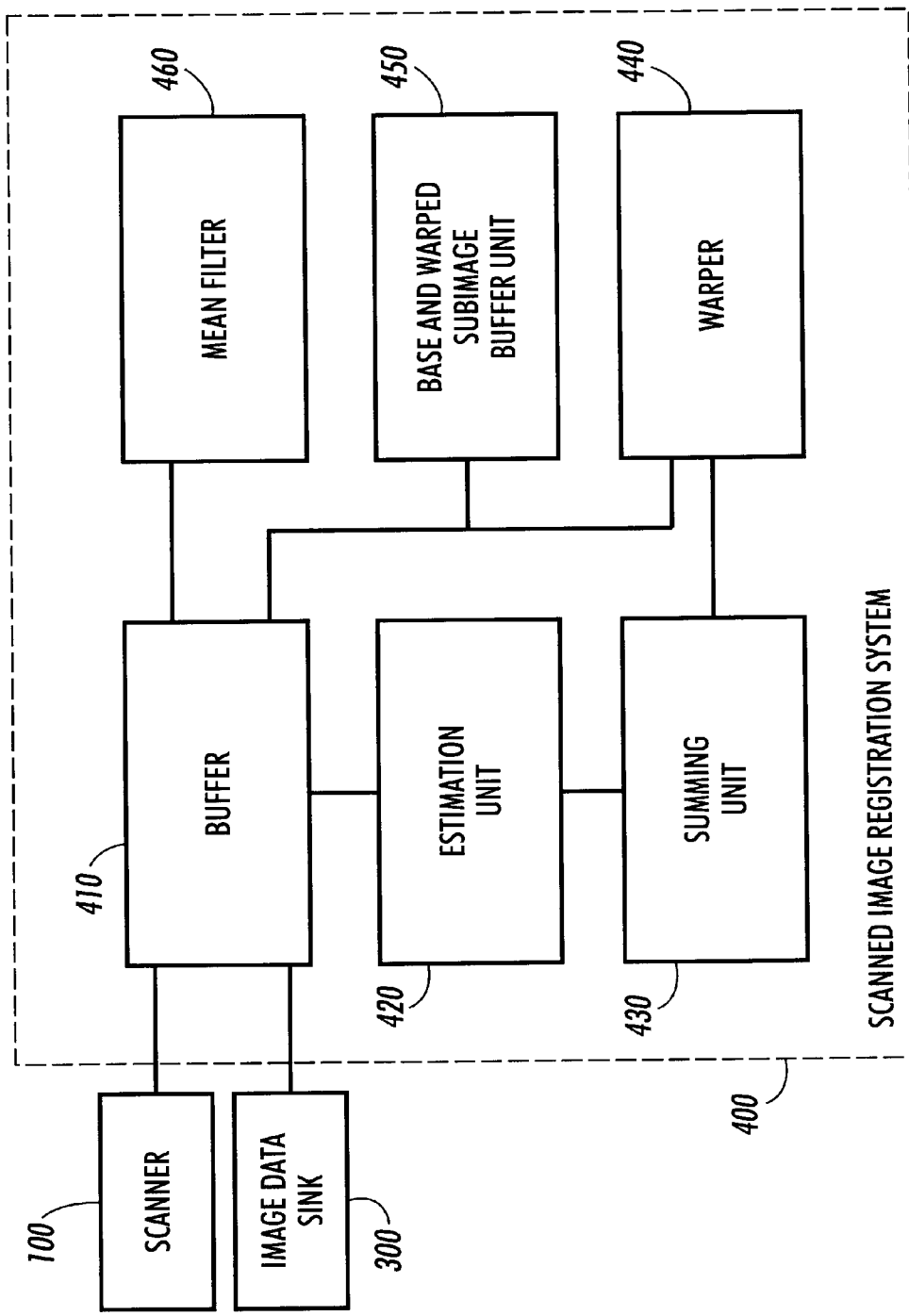
FIG. 21 is a block diagram outlining a second exemplary embodiment of a scanned image registration system according to this invention.

FIG. 21 shows a second exemplary embodiment of a scanned image registration system 400 according to this invention. As shown in FIG. 21, the scanned image registration system 400 includes a buffer 410 that receives the image signals over the link 110 from the scanner 100. The buffer 410 converts the image signals into subimages and stores up to two consecutive subimages. That is, the buffer 410 keeps only two subimages in memory for processing. In particular, in this scanned image registration system 400, the first subimage received from the scanner 100 and stored in the buffer unit 410 is used as the base image to which all other subimages will be warped into registration with.

When the analysis of these two subimages is completed, the buffer 410 deletes the older subimage and inputs the next subimage from the scanner 100 or from an interim memory. The buffer 410 transmits the two stored subimages to an estimation unit 420.

The estimation unit 420 estimates the set of image affine parameters for the two subimages stored in the buffer 410, as described below with respect to FIGS. 7 and 9 and either FIG. 8 or FIG. 10. Once the set of image affine parameters is estimated by the estimation unit 420, the set of image affine parameters is transferred to a summing unit 430 and a warper 440. At the same time, the two stored subimages are transferred from the buffer unit 410 through a signal line 412 to the warper.

The summing unit 430 adds the set of image affine parameters output by the estimation unit 420 to a running sum of the set of image affine parameters. The running sum is reset to zero before the first pair of subimages is analyzed by the estimation unit. Therefore, for the first pair of subimages, the output of the summing unit is the same as the set of image affine parameters output by the estimation unit 420.

The warper 440 compensates for the global deformation between the newest one of the two subimages stored in the buffer unit 410 and the base subimage. In particular, the warper 440 "warps" the newest one of the two subimages stored in the buffer unit 410 using the running sum of the set of image affine parameters output by the summing unit 430.

The warped subimages, along with the base subimage, are stored in a warped and base subimages buffer unit 450. Once all of the subimages, other than the base subimage, of the original document are warped by the warper 440, all of the subimages, including the base subimage, are output from the warped and base subimages buffer unit 450 to a mean filter 460. The mean filter 460 combines the subimages received from the warped and base subimages buffer unit 450 as outlined below in Eq. 10 to form the composite image. The composite image is then output by the mean filter 460 back to the buffer 410 so that the composite image can be output to the image data sink 300 over the link 310.

It should be appreciated, as described above, that the particular elements shown in FIG. 21 can be used more generally to generate and process transformation parameters.

It should be understood that each of the elements shown in FIG. 21 can be implemented as portions of a suitably programmed general purpose computer. Alternatively, each of the elements shown in FIG. 21 can be implemented as physically distinct hardware circuits within an ASIC, or using a FPGA, a PDL, a PLA or a PAL, or using discrete logic elements or discrete circuit elements. The particular form each of the elements shown in FIG. 21 will take is a design choice and will be obvious and predictable to those skilled in the art.

Figure 6:
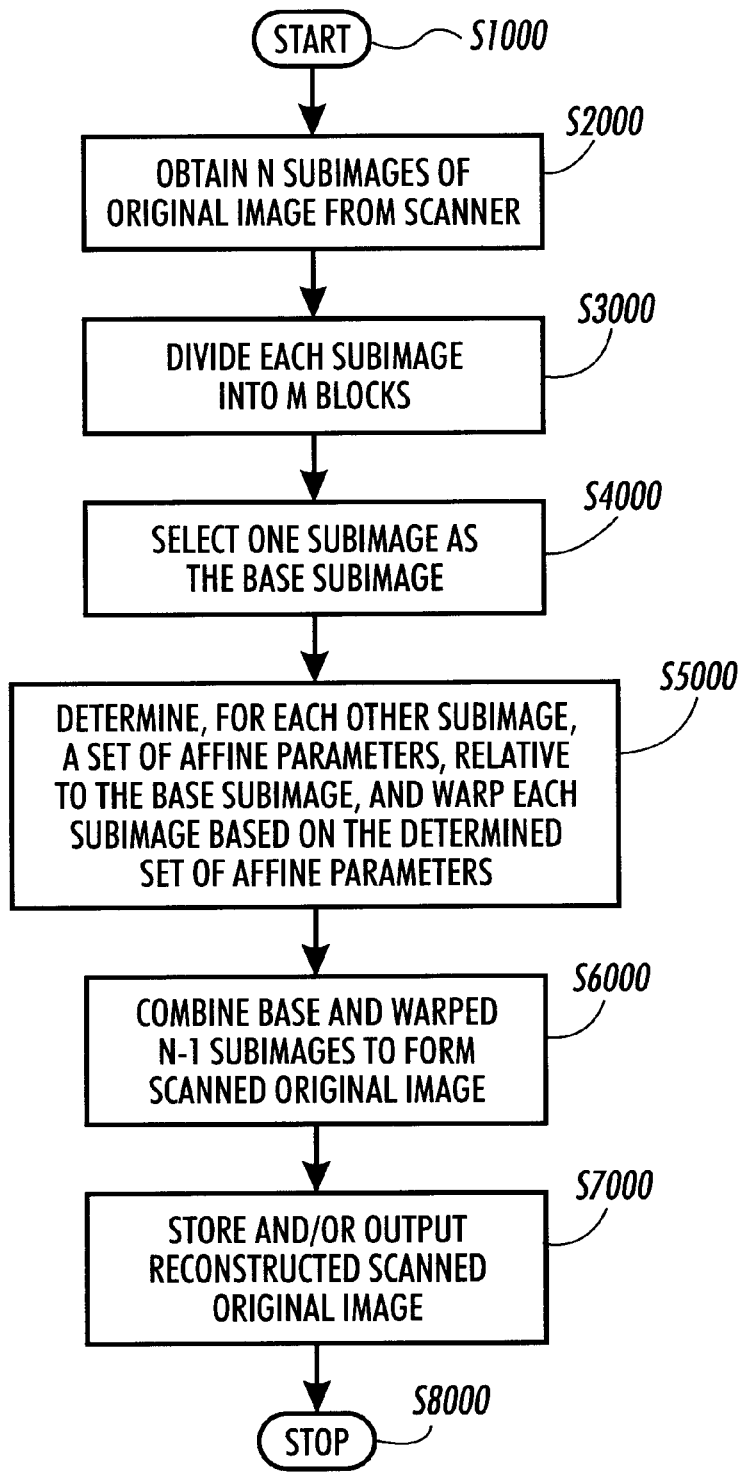
FIG. 6 is a flowchart outlining one exemplary embodiment of the scanned image registration method according to this invention.

FIG. 6 is a flowchart outlining one exemplary embodiment of the method of constructing a composite image from a plurality of scanned subimages according to this invention. Beginning in step S1000, control continues to step S2000, wherein N subimages of an original document are obtained from a scanner. Then, in step S3000, each of the N subimages are divided into M blocks. Next, in step S4000, one of the N subimages is selected as the base subimage, as outlined above. Control then continues to step S5000.

In step S5000, for each other subimage, a set of image affine parameters is determined relative to the base subimage. Each other subimage is then warped based on the determined set of image affine parameters for that subimage relative to the base subimage. Next, in step S6000, the base and the N−1 warped subimages are combined to form, or reconstruct, a composite image of the scanned document. Next, in step S7000, the reconstructed scanned composite image formed in step S6000 is stored and/or output. Control then continues to step S8000, where the method stops.

It should be appreciated, as described above, that step S5000 of FIG. 7, and the particular substeps of step S5000 described below in FIGS. 7–12B can be used more generally to generate transformation parameters for the subimages and warp the subimages based on the transformation parameters.

Figure 7:
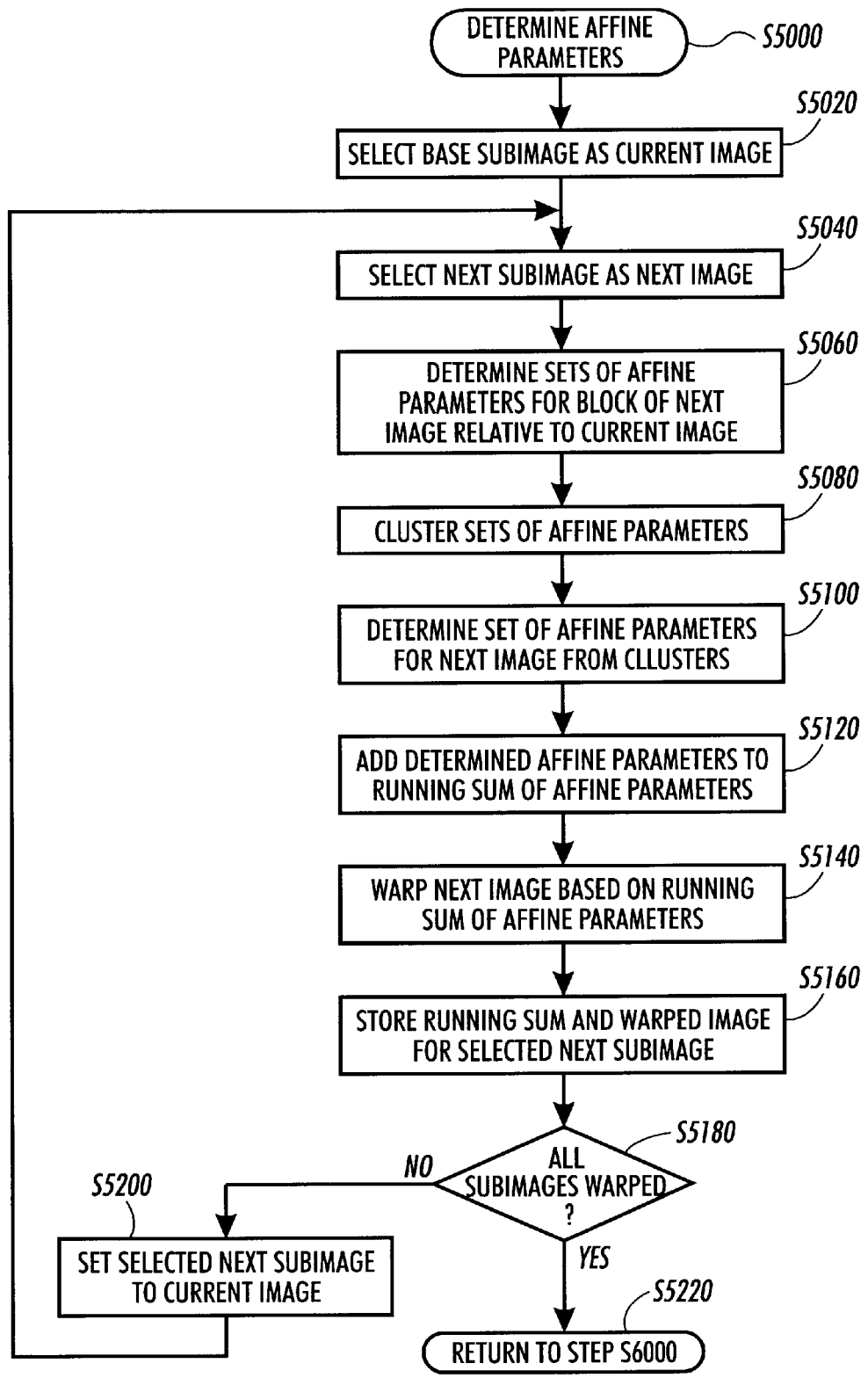
FIG. 7 is a flowchart outlining in greater detail one exemplary embodiment of the image affine parameters determining method of FIG. 6.

FIG. 7 is a flowchart outlining in greater detail one exemplary embodiment of the image affine parameter determining step S5000 of FIG. 6. Beginning in step S5000, in this exemplary embodiment, control continues to step S5020, where the selected base subimage in step S4000 is set to the current image. Next, in step S5040, the next subimage in the scanning order is selected as the next image. Then, in step S5060, one or more sets of block affine parameters is determined for each block of the next image relative to the blocks of the current image. Control then continues to step S5080.

In step S5080, the sets of block affine parameters determined in step S5060 are clustered. Then, in step S5100, a single set of image affine parameters is determined for the next image from the clusters formed in step S5080. Next, in step S5120, the image affine parameters determined for the next image are added to a running sum of image affine parameters. The running sum of image affine parameters is initially set to 0, indicating the image affine parameters for warping the base image into registration with the base image are all 0. Then, when the second subimage is determined relative to the base image, its set of image affine parameters are added to the running sum. Thus, when the set of image affine parameters for the third subimage are determined relative to the second subimage, these image affine parameters are added to the running sum to completely warp the third subimage into registration with the first, or base, subimage. Control then continues to step S5140.

In step S5140, the next image is warped based on the updated running sum of image affine parameters updated in step S5120. Then, in step S5160, the updated running sum of image affine parameters and the warped next image are stored. In particular, the warped next image is stored as the warped version of the selected next subimage. Then, in step S5180, the subimages are checked to determine if all of the subimages other than the base subimage have been warped. If so, control jumps to step S5220. Otherwise, control continues to step S5200.

In step S5200, the previously selected next subimage, which was selected as the next image, becomes the current image. Control then returns to step S5040 to select the next subimage as the next image. In contrast, in step S5220, control returns to step S6000.

Figure 8:
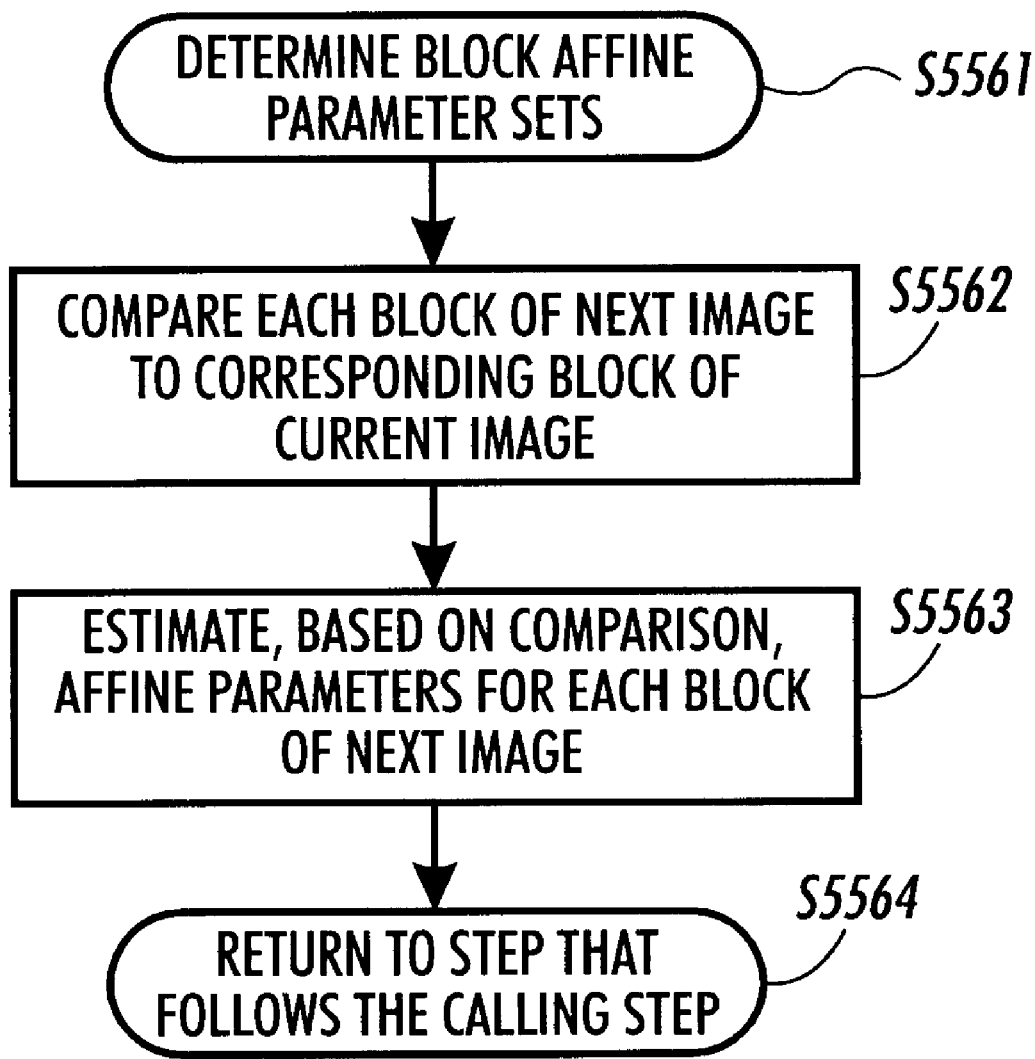
FIG. 8 is a flowchart outlining in greater detail one exemplary embodiment of the block affine parameter set determining method of FIG. 7.

FIG. 8 is a flowchart outlining one exemplary embodiment of the block affine parameter set determining step S5060 of FIG. 7. Beginning in step S5061, control continues to step S5062, where each block of the next image is compared to a single corresponding block of the current image. In particular, the corresponding block of the current image is the block in the same relative location in the current image as the corresponding block in the next image. Then, in step S5063, based on the comparison for one of the M blocks, a set of block affine parameters is estimated for that block of the next image. Next, in step S5064, control returns to step S5080, which is the step following step S5060 in FIG. 7.

Figure 9:
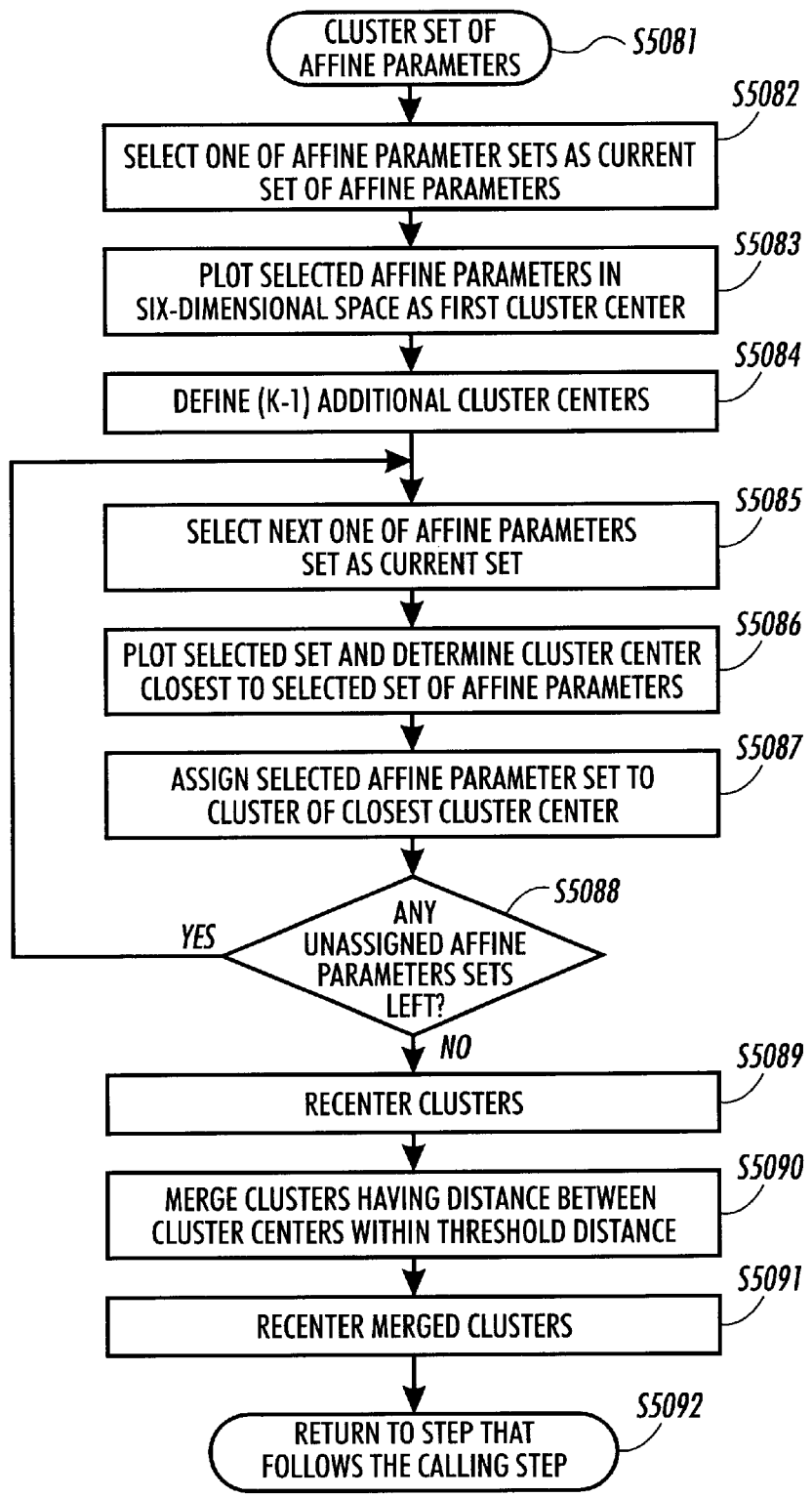
FIG. 9 is a flowchart outlining in greater detail one exemplary embodiment of the block affine parameter set clustering method of FIG. 7.

FIG. 9 is a flowchart outlining one exemplary embodiment of the block affine parameter set clustering step S5080 of FIG. 7. Beginning in step S5087, control continues to step S5082, where one of the block affine parameter sets is selected as the current block affine parameter set. Then, in step S5083, the block affine parameters of the selected block affine parameter set are plotted in the three-dimensional space or the six-dimensional space as a first cluster center. Next, in step S5084, (k−1) additional cluster centers are defined relative to the plotted first cluster center so that the initial k cluster centers are generally evenly distributed throughout the image. In general, this is guaranteed by using a distance threshold such that the next cluster center is at a distance from the previously-defined cluster centers equal to the distance threshold. This ensures that at least one cluster center is from the overlapping area. Control then continues to step S5085.

In step S5085, a next one of the block affine parameter sets is selected as the current set. Then, in step S5086, the block affine parameters for the current set are plotted in the three-dimensional space or the six-dimensional space, and the cluster center closest to the plotted current set of block affine parameters is determined. Next, in step S5087, the current set of block affine parameters is assigned to the cluster of the closest cluster center determined in step S5086. Control then continues to step S5088.

In step S5088, the block affine parameter sets are checked to determine if there are any unassigned block affine parameter sets remaining. If so, control jumps back to step S5085. Otherwise, control continues to step S5089.

In step S5089, the clusters are recentered. Then, in step S5090, clusters having a distance between the cluster centers within a threshold distance are merged together. Next, in step S5091, the merged clusters are recentered, as in step S5089. Control then continues to step S5092, which returns to step S5100, which is the step following step S5080 in FIG. 7.

It should be appreciated the above-outlined description of steps S5060 and S5080 in FIGS. 7–9 assumes that all of the sets of block affine parameters for each of the M blocks of the next image are determined before any of the sets of block affine parameters are plotted according to the method outlined in FIG. 9. However, it should be appreciated that, in contrast, the methods of steps S5060 and S5080 could be intermittently intertwined, such that, after each set of block affine parameters for a particular one of the M blocks is determined according to steps S5062 and S5063, the determined set of block affine parameters for that block is immediately plotted in steps S5083 or S5086 and then defined as either the first cluster center or assigned to a particular defined cluster, respectively, The above-outlined exemplary image reconstruction method according to this invention corresponds to the least computationally demanding scanning order described above. In particular, the above-outlined exemplary embodiment of the image reconstruction method according to this invention uses a simple block affine parameter determining step, which compares each block of one image to a single corresponding block of the other subimage. To provide a more accurate group of block affine parameter sets, the simple block affine parameter determining method shown in FIG. 8 can be replaced with a more complex block affine parameter determining method, as shown in FIG. 10.

Figure 10:
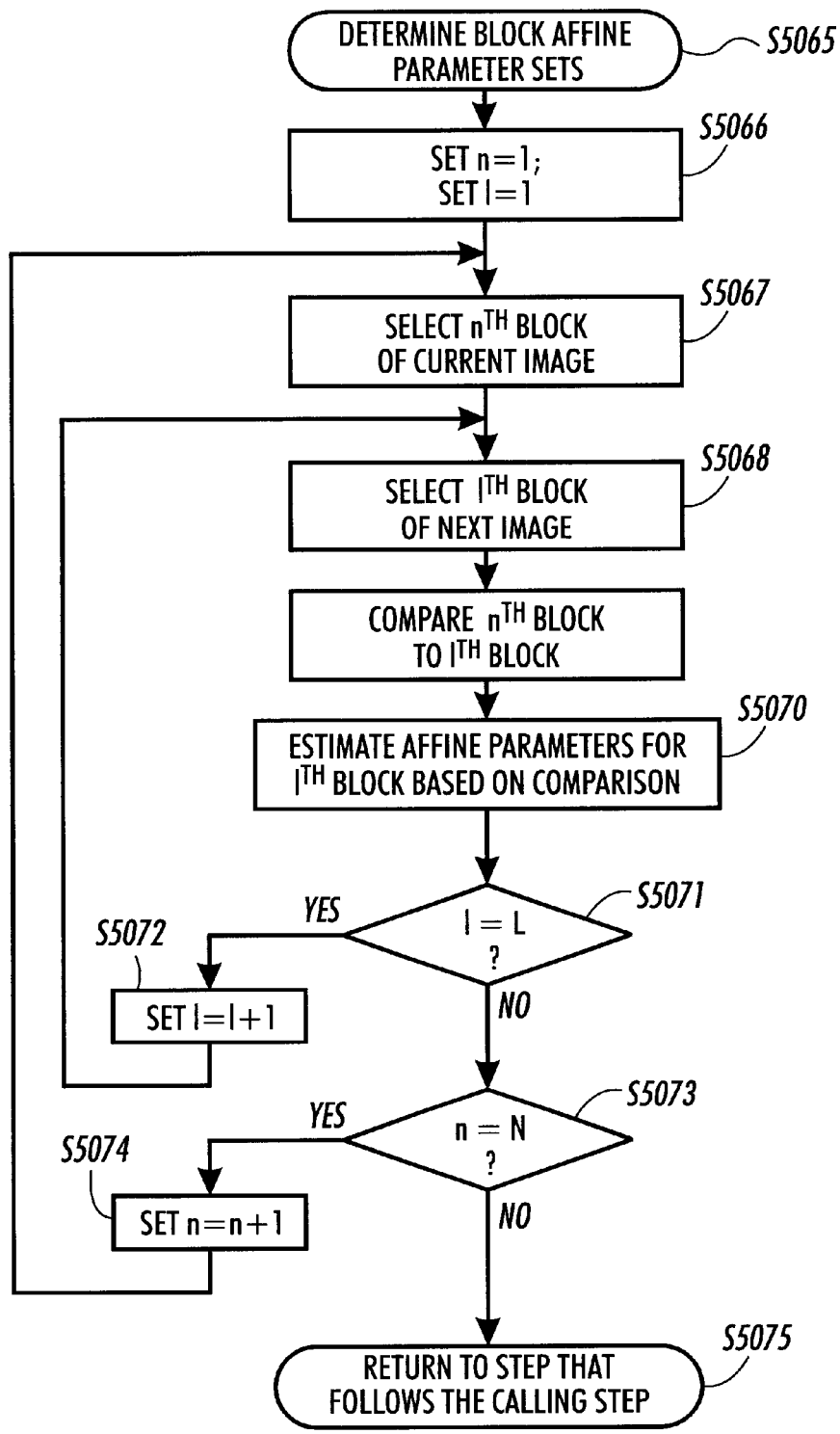
FIG. 10 is a flowchart outlining in greater detail a second exemplary embodiment of the block affine parameter set determining method of FIG. 7.

Accordingly, as shown in FIG. 10, when performing the block affine parameter set determining step of step S5060, control could instead continue to step S5065 instead of to step S5061. From step S5065, control continues to step S5066, where a current image block counter M and a next subimage block counter L are set to 1. Then, in step S5067, the "$m^{th}$" block of the current image is selected. Next, in step S5068, the "$l^{th}$" block of the next image is selected. Control then continues to step S5069.

In step S5069, the $m^{th}$ block is compared to the $l^{th}$ block. Then, in step S5070, the block affine parameters set for the $l^{th}$ block is estimated based on the comparison of the $l^{th}$ block to the $m^{th}$ block. Next, in step S5071, the $l^{th}$ block is checked to determine if it is the last block of the next image. If not, control continues to step S5072. Otherwise, control jumps to step S5073. In step S5072, the value of "l" is incremented by one and control returns to step S5068.

Otherwise, in step S5073, the $m^{th}$ block is checked to determine if it is the last block of the current image. If not, control continues to step S5074. Otherwise, control jumps to step S5075. In step S5074, the value of "$m^{th}$" is incremented by one and control returns to step S5067. In contrast, in step S5075, control returns to step S5080, which is the step following step S5060 in FIG. 7.

As set forth above with respect to steps S5060 and S5080 and FIGS. 7–9, the steps outlined above with respect to FIGS. 9 and 10 can also be combined so that, as each block of the next image is compared to one of the blocks of the current image, the resulting set of block affine parameters is immediately plotted and either used to define the cluster centers or immediately assigned to one of the defined clusters.

To provide a more accurate group of block affine parameter sets in a more computationally-efficient manner, the simple block affine parameter determining method shown in FIG. 8 can be replaced with the second alternative method described above. In this method, a small subset of the blocks of a current subimage are selected. Then, a first block of the selected subset is selected. Next, a counter is reset to count the number of blocks of the next subimage that have been compared to the selected block.

A first block of the next subimage is then selected. Next, the selected block of the current subimage is compared to the selected block of the next subimage. Then, the block affine parameters set for the selected block of the current subimage is estimated based on the comparison of the selected block of the next subimage to the selected block of the current subimage.

The counter is then checked to determine if all of the blocks of the next subimage have been compared to the selected block of the current subimage. If not, a next block of the next subimage is selected and the comparing and estimating steps are repeated. If so, the selected subset of the blocks of the current subimage is checked to determine if all of the blocks of the subset have been selected. If not, a next block of the subset is selected and the resetting, selecting, comparing, and estimating steps are repeated.

If so, an offset value is determined based on the estimated block affine parameters. The offset value roughly represents the amount of translation between the current and next subimage and indicates how the blocks of the current subimage should be compared to the blocks of the next subimage to determine the image affine parameters. Steps S5062–S5064 of the flowchart of FIG. 8 are then performed based on the offset value.

As set forth above with respect to FIGS. 9 and 10, the steps outlined above can also be combined with the steps of FIG. 9 so that, as each block of the next image is compared to one of the blocks of the current image, the resulting set of block affine parameters is immediately plotted and either used to define the cluster centers or immediately assigned to one of the defined clusters.

Figure 11A:
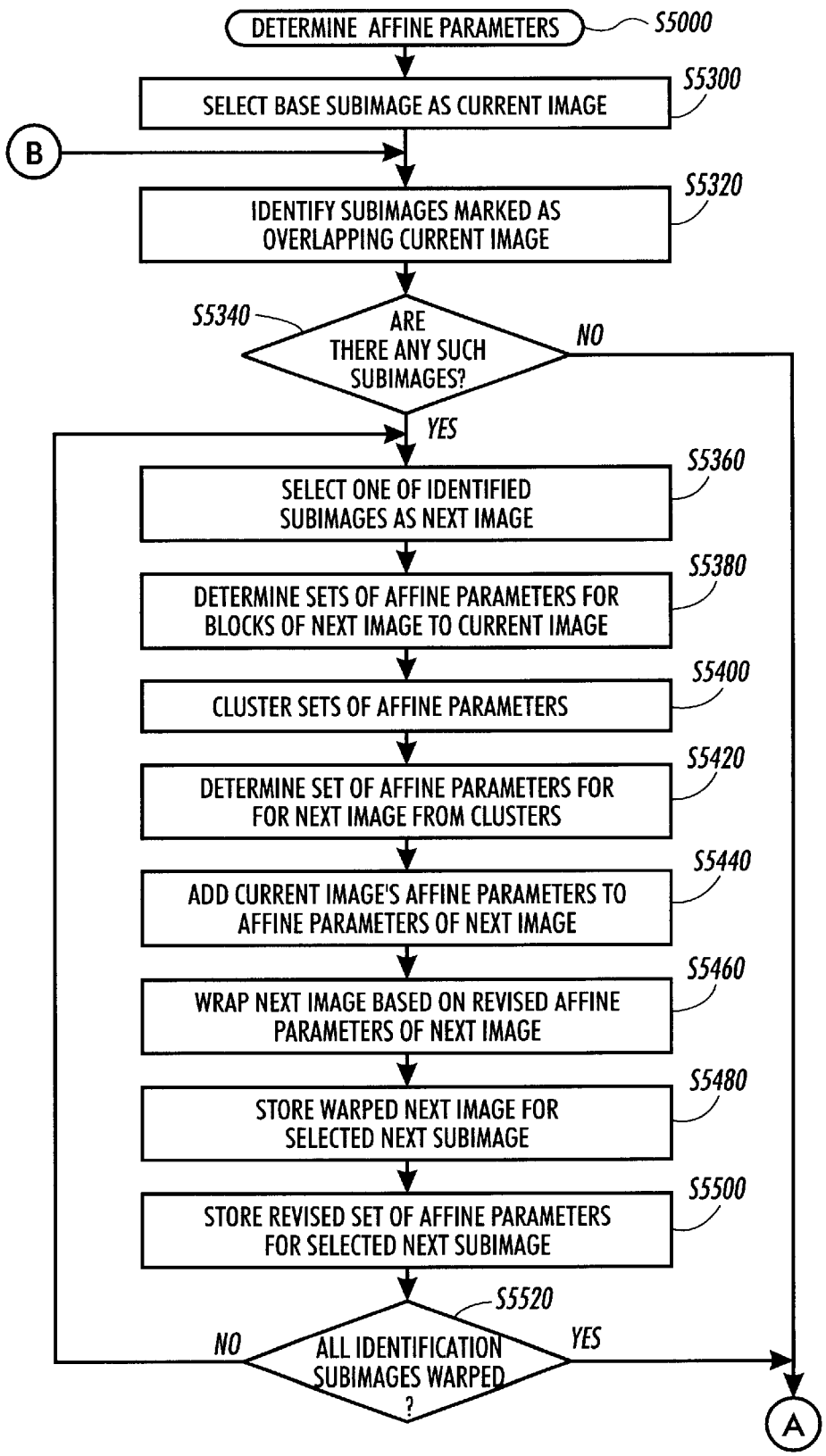
FIGS. 11A and 11B are a flowchart outlining in greater detail a second exemplary embodiment of the image affine parameters determining step of FIG. 6.
Figure 11B:
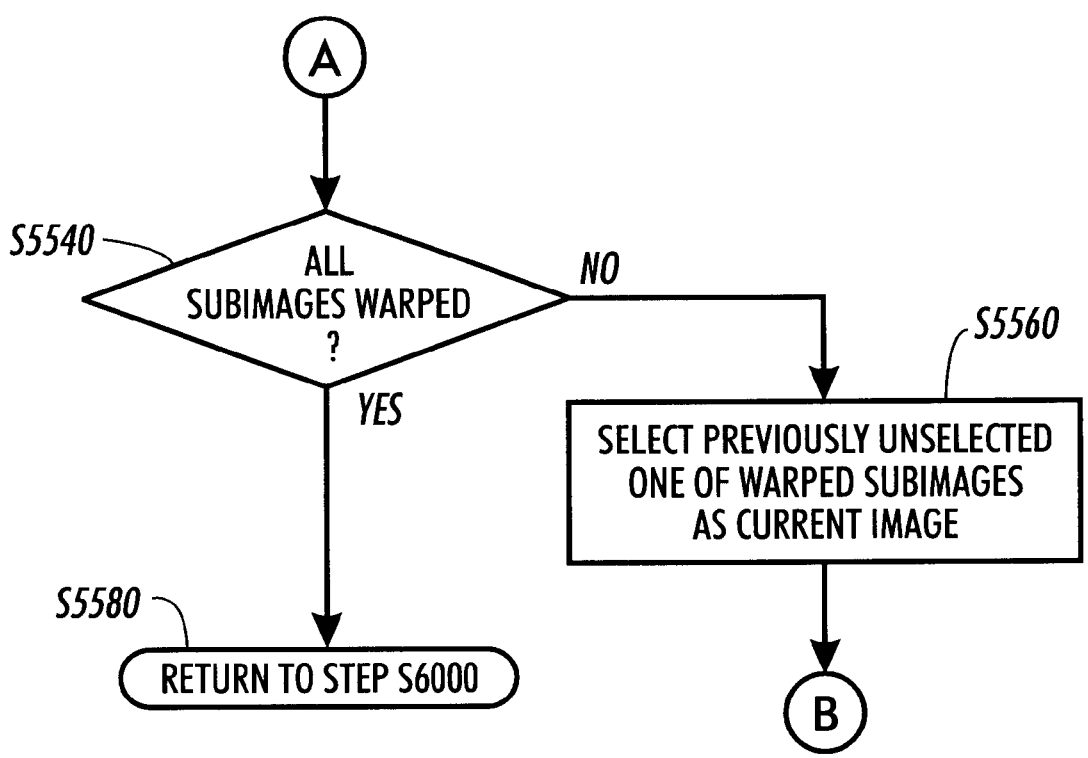

FIGS. 11A and 11B are a flowchart outlining in greater detail a second exemplary embodiment of the image affine parameter determining step S5000 of FIG. 6. As indicated above, this second exemplary embodiment of the image affine parameter determining step S5000 can be used when the user explicitly identifies the base subimage and explicitly identifies which subimages overlap which other subimages.

As shown in FIGS. 11A and 11B, beginning in step S5000, control continues to step S5300, where the identified base subimage is selected as the current image. Then, in step S5320, the subimages that are marked or identified as overlapping the current image are themselves identified. Next, in step S5340, the identified subimages are checked to ensure there is at least one remaining unwarped subimage that overlaps the current image. If there are any such subimages that are marked as overlapping the current image, control continues to step S5360. Otherwise, control jumps to step S5540.

In step S5360, one of the identified subimages that overlaps the current image is selected as the next image. Then, in step S5380, the sets of block affine parameters for the blocks of the next image relative to the current image are determined. It should be appreciated that, in step S5380, either of the block affine parameter set determining methods, as outlined above with respect to FIGS. 8 and 10, can be used. As described above, the various embodiments of the block affine parameter set determining methods shown in FIGS. 8 and 10 will be selected based on the available computational resources, the desired accuracy, and/or the desired time to perform the processing. Control then continues to step S5400.

In step S5400, the sets of block affine parameters determined in step S5380 are clustered. Then, in step S5420, the set of image affine parameters for the next image relative to the current image is determined based on the clustering performed in step S5400. Then, in step S5440, the current image's set of image affine parameters are concatenated with the determined set of image affine parameters for the next image determined in step S5420. That is, in step S5440, the image affine parameters for the current image, which warp that image into registration with the base image, are concatenated with the image affine parameters for the next image. The current set of image affine parameters for the next image, as determined in step S5420, merely warp that image into registration with the current image, which is not necessarily the base image. By concatenating the current image's set of image affine parameters with the image affine parameters for the next image relative to the current image, the next image can be warped into registration with the base image. Control then continues to step S5460.

If the image affine parameters represent the translation and angle, then the image affine parameters for the current image are concatenated with the image affine parameters for the next image by adding the translation image affine parameters together and adding the angle image affine parameters together. However, if the image affine parameters represent the sine and cosine values of the angle instead of the angle itself, the sine and cosine values cannot be directly added together.

In step S5460, the next image is warped into registration with the base image based on the revised image affine parameters as revised in step S5440. Next, in step S5480, the warped next image is stored as the warped version of the selected next subimage. Then, in step S5500, the revised set of image affine parameters for the selected next subimage are stored so that any unwarped subimages which are identified as overlapping this selected next subimage can themselves be warped into registration with the base subimage in step S5440 and step S5460. Control then continues to step S5520.

In step S5520, the set of identified subimages that overlap the current image is checked to determine if all such identified subimages have been warped. If so, control continues to step S5540. Otherwise, if any unwarped identified subimages remain, control jumps back to step S5360.

In step S5540, all of the non-base subimages are checked to determine if they have all been warped into registration with the base subimage. If so, control jumps to step S5580. Otherwise, if any unwarped non-base subimages remain, control continues to subimage 5560.

In step S5560, a previously unselected one of the warped subimages is selected as the current image. Control then jumps back to step S5320. In contrast, in step S5580, control is returned to step S6000.

Figure 12A:
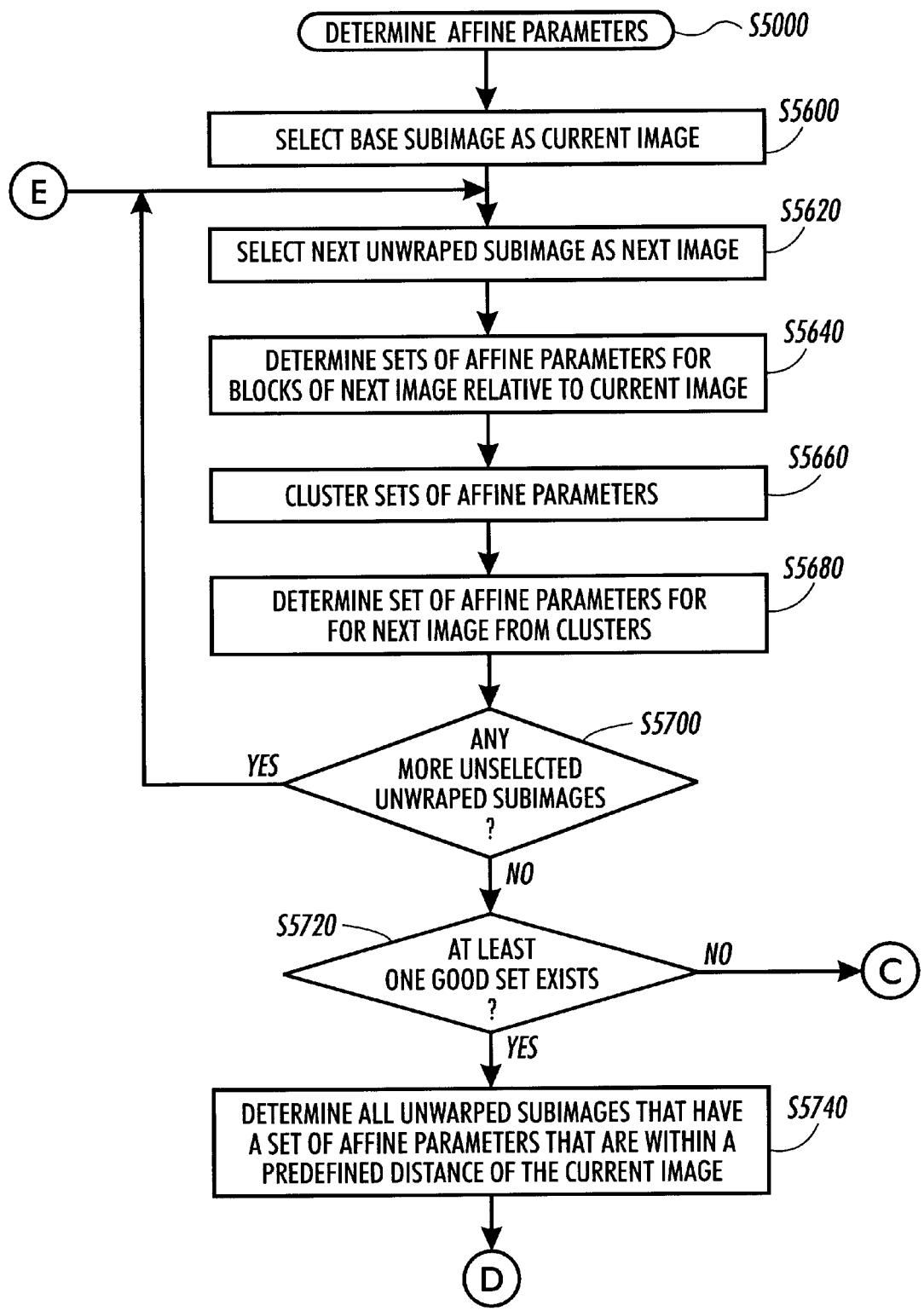
FIGS. 12A and 12B are a flowchart outlining in greater detail a third exemplary embodiment of the image affine parameters determining step of FIG. 6.
Figure 12B:
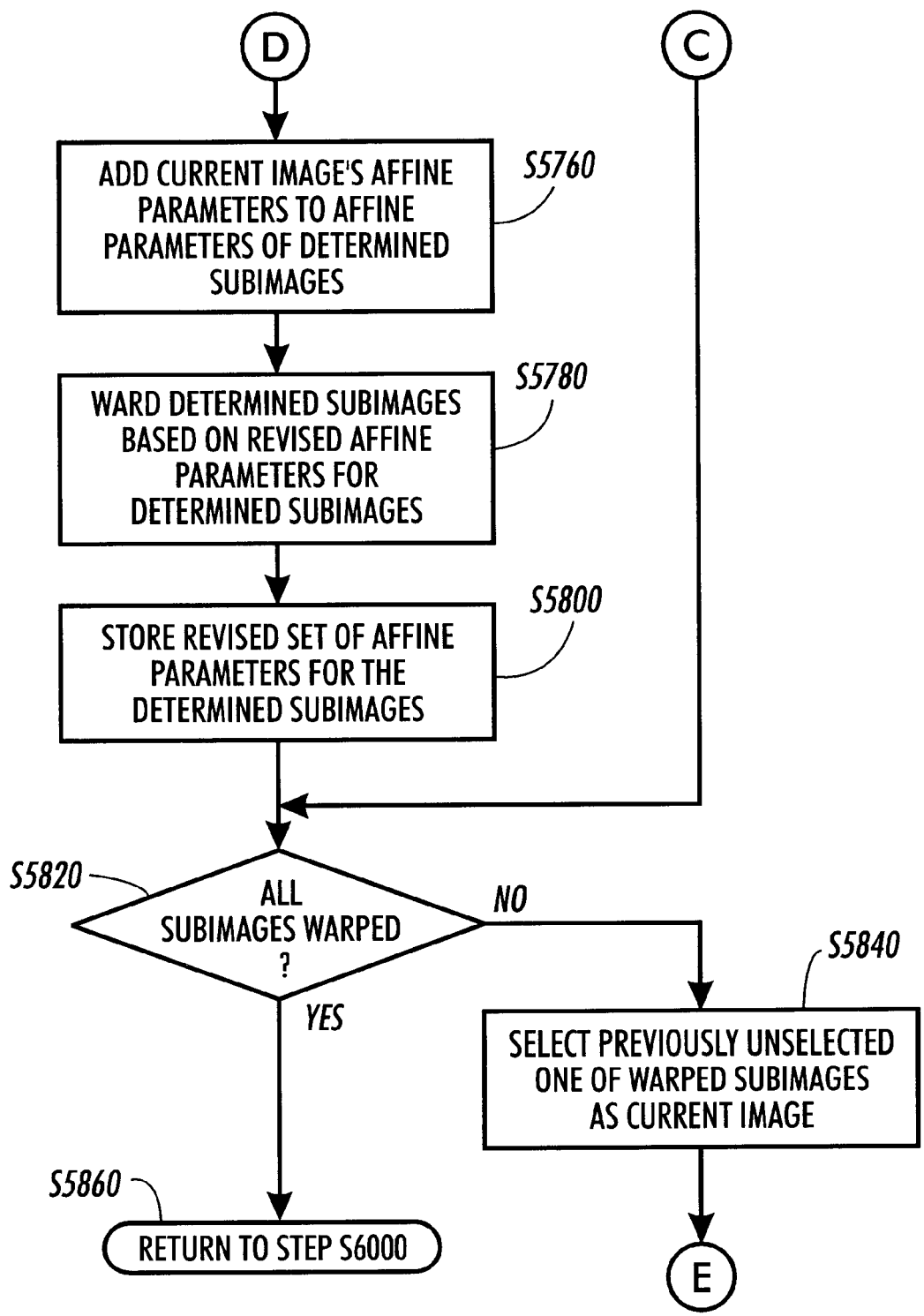
Figure 16:
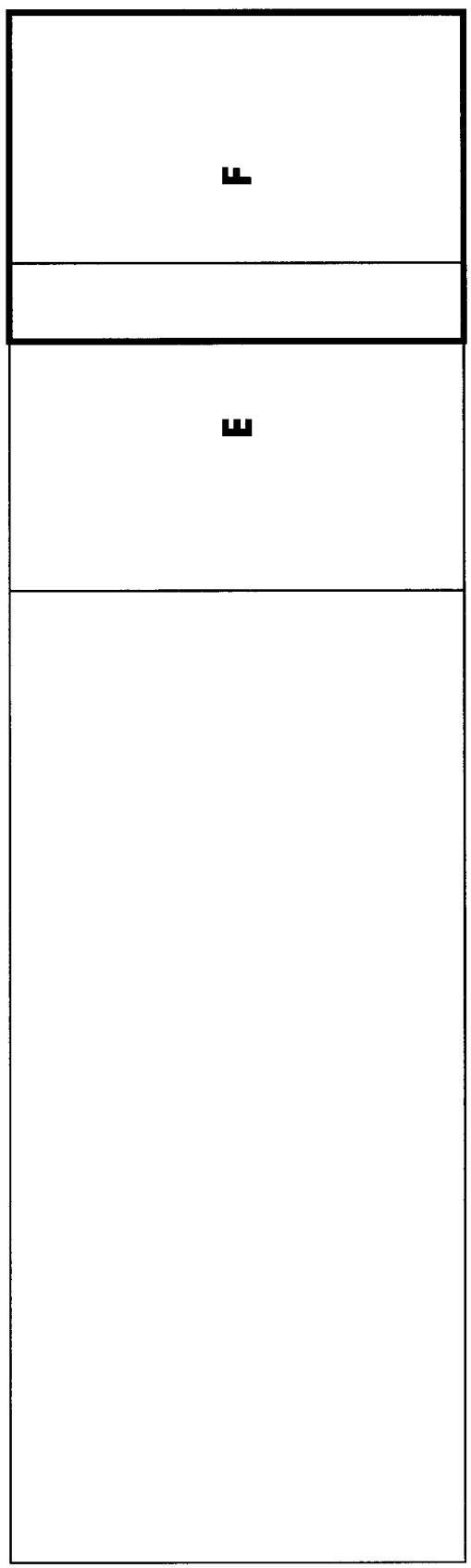
FIG. 16 shows the fifth and sixth subimages of the original document shown in FIG. 1 after warping the fifth subimage.
Figure 17:
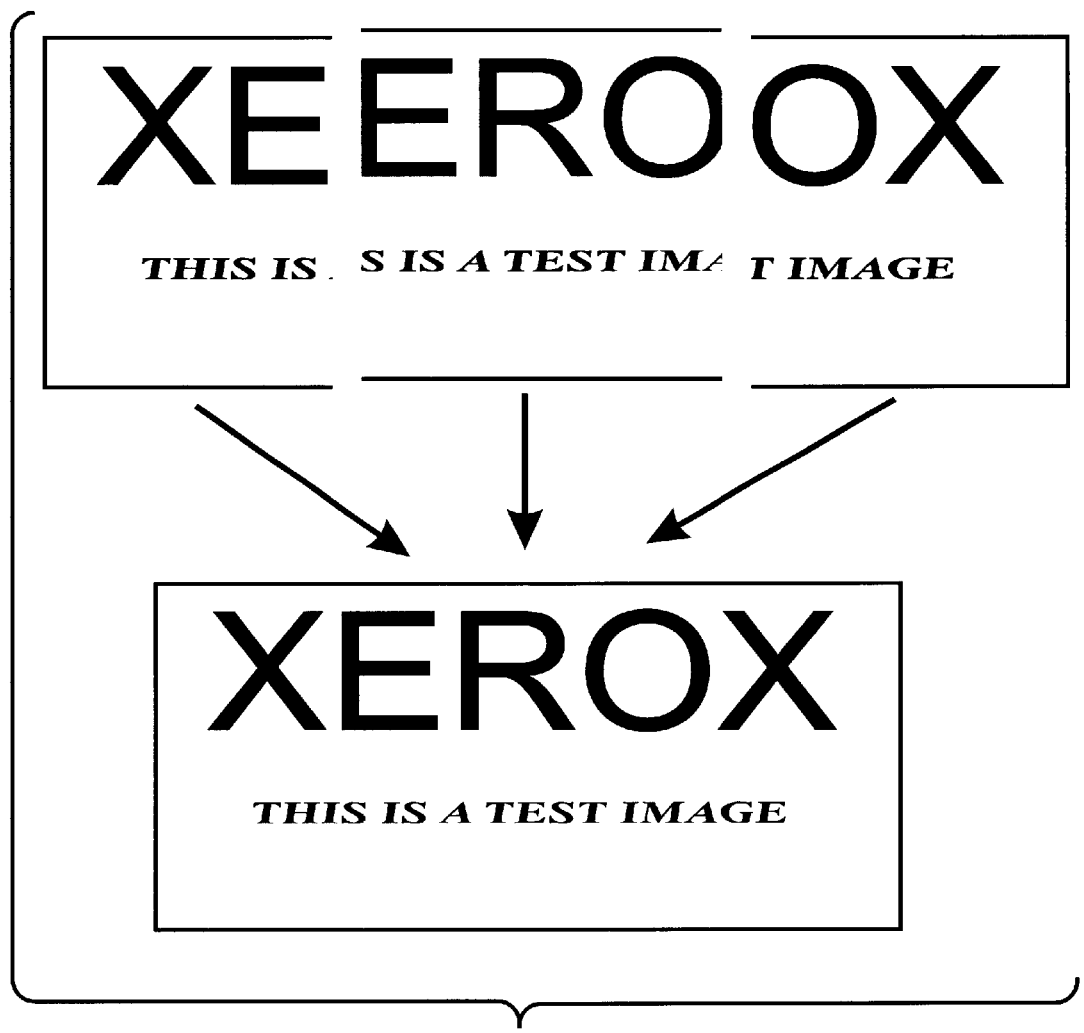
FIG. 17 shows three subimages of an exemplary document and the resulting composite, or reconstructed original, image.
Figure 18:
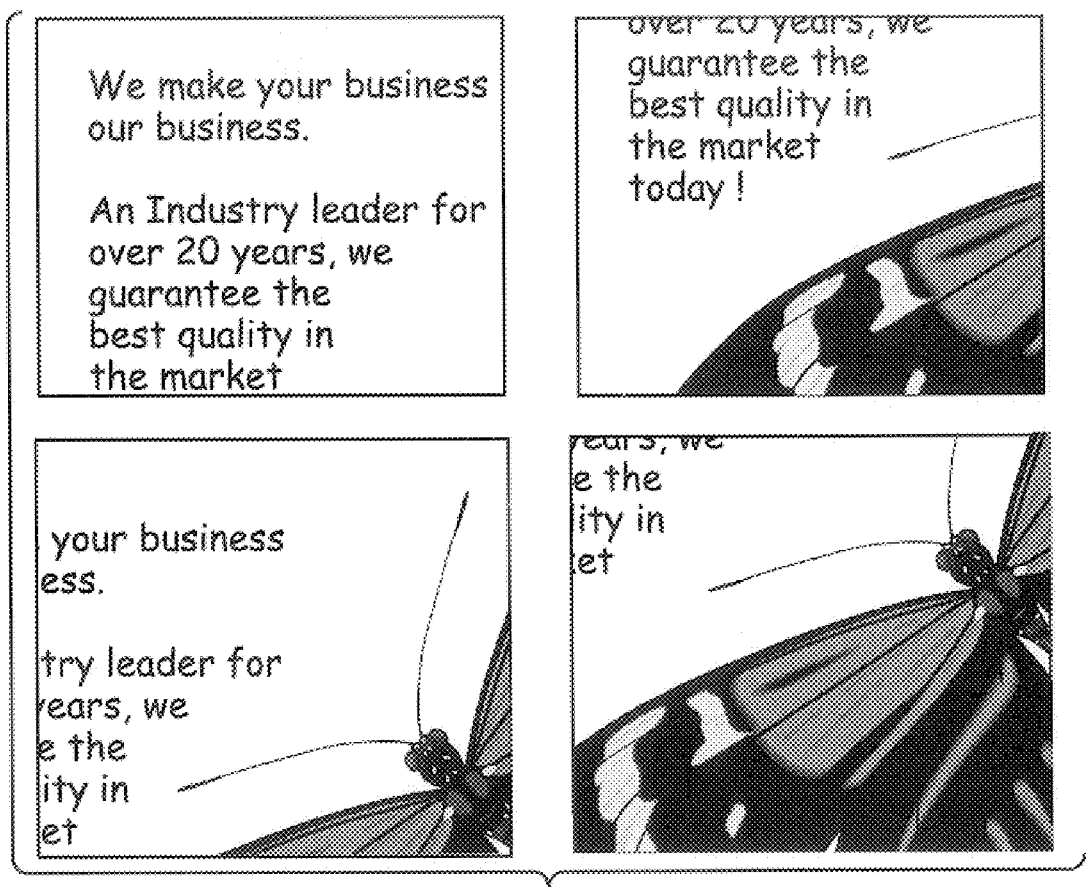
FIG. 18 shows four subimages obtained from scanning an original image.
Figure 19:
FIG. 19 shows the composite image reconstructed from the four subimages shown in FIG. 18 according to this invention.
Figure 20:
FIG. 20 shows a reconstructed image corresponding to the image shown in FIG. 19 obtained by interpolation.

FIGS. 12A and 12B outline in greater detail a third exemplary embodiment of the block affine parameter set determining step S5000. This third exemplary embodiment of the block affine parameter set determining step S5000 is usable when the user has not scanned the subimages in any particular order and has not otherwise identified the base subimage or which of the non-base subimages overlap the base subimage or the other subimages. In this third exemplary embodiment, the base subimage can be any one of the scanned subimages, although the first such scanned subimage will generally be automatically treated as the base subimage.

Accordingly, as shown in FIGS. 12A and 12B, the third exemplary embodiment of the image affine parameter set determining step begins in step S5000 and continues to step S5600. In step S5600, the base subimage is selected as the current image. Next, in step S5620, the next unwarped subimage is selected as the next image. Then, in step S5640, the sets of block affine parameters for the blocks of the next image are determined relative to the current image. As set forth above with respect to FIGS. 11A and 11B, either one of the exemplary embodiments for the block affine parameter determining step S5060 outlined in FIGS. 8 and 10 can be used in step S5640. Control then continues to step S5660.

In step S5660, the sets of block affine parameters are clustered according to step S5080 as shown in FIG. 9. As set forth above with respect to steps S5060 and S5080 and FIGS. 7–9, the steps outlined above with respect to FIGS. 9 and 10 can also be combined so that, as each block of the next image is compared to one of the blocks of the current image, the resulting set of block affine parameters is immediately plotted and either used to define the cluster centers or immediately assigned to one of the defined clusters. Next, in step S5680, a set of image affine parameters for the next image relative to the current image is determined from the clustering performed in step S5660. Control then continues to step S5770.

In step S5700, the subimages are checked to determine if there any more unselected and unwarped subimages for which a set of image outline parameters relative to the current image needs to be determined. If so, control jumps back to step S5620. Otherwise, if all of the unwarped subimages have been selected, control continues to step S5720.

In step S5720, the sets of image affine parameters for all the unwarped subimages relative to the current image are checked to determine if at least one of the sets of image affine parameters indicates the corresponding unwarped subimage actually overlaps the current image. In general, a good set of image affine parameters occurs when the cluster corresponding to that set of image affine parameters contains a number of members that is above a threshold. The threshold indicates that the cluster probably occurred because it represents blocks that appear in both the corresponding unwarped subimage and the current image. If there are no such sets, control jumps to step S5820. Otherwise, control continues to step S5740.

In step S5740, the sets of image affine parameters determined in step S5720 for all of the unwarped subimages are checked to determine which such unwarped subimages have a set of image affine parameters that are within a predefined distance of the current image. That is, the unwarped subimages are checked to identify which subimages actually overlap the current image. Next, in step S5760, for each such identified subimage, the current image's image affine parameters are added to the image affine parameters for that identified subimage. Then, in step S5780, each identified subimage identified in step S5740 is warped based on its corresponding image affine parameters, as revised in step S5760, to warped that identified subimage into registration with the base subimage. Control then continues to step S5800.

In step S5800, the warped subimages and the corresponding revised image affine parameters for the identified subimages are stored. Next, in step S5820, the non-base subimages are checked to determine whether all of the non-base subimages have been warped into registration with the base subimage. If so, control jumps to step S5860. Otherwise, control continues to step S5840.

In step S5840, a previously unselected one of the warped subimages is selected as a current image. Control then returns to step S5620. In contrast, in step S5860, control returns to step S6000.

For any pair of one block in the current image and one block in the next image to be compared in steps S5062 or 5067, these blocks are compared to generate a set of affine parameters as set forth with respect to FIGS. 12–14 of the 115 patent. In particular, with respect to the systems and methods for registering scanned subimages to form a composite scanned image, the spatial offsets, including both the translational offsets and the rotational offsets, between two overlapping subimages are determined by generating a set of image affine parameter estimates $\bar{a}_i$, where:

$$\bar{a}_i = (a_0, a_1, a_2, a_3, a_4, a_5). \tag{1}$$

Each set $\bar{a}_i$ of image affine parameter estimates is determined using the well-known optical flow analysis and affine parameterization techniques as discussed in Black. Specifically, if there is an affine deformation, including either or both of a rotation or a translation, between the two overlapping subimages, the spatial transformation can be given as:

$$x' = a_0 x + a_1 y + a_2, \tag{2}$$

$$y' = a_3 x + a_4 y + a_5, \tag{3}$$

where:

$a_0, a_1, a_2, a_3, a_4$ and $a_5$ are the affine parameters;

(x,y) are the coordinates of a corresponding pixel in a current one of the subimages; and (x',y') are the coordinates of the corresponding pixel in the next subimage, i.e., the subimage to be warped into registration with the current subimage.

It should be appreciated that when there is just a translational deformation between one subimage and a second subimage that overlaps that first subimage, the "$a_0$" coefficient will be equal to 1, while the "$a_1$" coefficient will be equal to 0. Similarly, in this case, the "$a_3$" coefficient will be equal to 0, while the "$a_4$" coefficient will be equal to 1. The "$a_2$" and "$a_5$" coefficients will then give the horizontal and vertical offsets between the two subimages. When there is a rotational deformation between the two subimages, the "$a_0$", "$a_1$", "$a_3$" and "$a_4$" coefficients will provide the sinus and cosinus values of the rotation angle.

In particular, the image affine parameters of the image affine parameters set $\bar{a}_i$ are estimated using a least-squares estimation technique. Then, the next subimage can be placed into registration with the current subimage by warping the next subimage using the image affine parameter estimates $a_0, a_1, a_2, a_3, a_4$, and $a_5$. Specifically, every pixel within the next subimage is warped using the determined set $\bar{a}_i$ of estimated image affine parameters to obtain a warped version of that subimage.

If $I_{or}(i,j)$ is the image value of the pixel (i,j) in the next subimage before warping, then the relationship between the warped version of the next subimage and the original version of the next subimage is:

$$I_{or}(i,j) = I_w[a_0 i + a_1 j + a_2, a_3 i + a_4 j + a_5], \tag{4}$$

where:

$I_w[a_0 i + a_1 j + a_2, a_3 i + a_4 j + a_5]$ is the image value in the warped version of the next subimage.

Using the standard brightness constancy assumption, the error associated with an image affine deformation between the current subimage k and the next subimage (k+1) is:

$$E(a_{k+1,k}) = \Sigma[(I_k(x,y) - I_{k+1}(a_0 x + a_1 y + a_2, a_3 x + a_4 y + a_5)]^2, \tag{5}$$

$$k = 1 \ldots N,$$

where:

$I_k$ denotes the image intensity of the current image;

$I_{k+1}$ denotes the image intensity of the next subimage;

N is the number of subimages that must be combined to construct the composite image of the original document;

k is the index indicating which subimages are being compared;

$a_{(k+1,k)}$ is the estimated image affine parameters associated with the $(k+1)^{th}$ subimage relative to the $k^{th}$ subimage; and $E(a_{k+1,k})$ is the error associated with the affine deformation between the current and next subimages. It should be appreciated that, in determining the error $E(a_{k+1,k})$ associated with the affine deformation between the current and next subimages, the summation is made over the square of the difference between the image intensity $I_k$ of the current image and the image intensity $I_{k+1}$ of the next subimage.

In Eq. 5, the deformation is assumed to be constant throughout the whole image. However, this assumption is invalid when there is a large deformation between the subimages, i.e., when the subimages overlap by only a small amount. Thus, each of the subimages is divided into non-overlapping blocks. The block affine parameters are then estimated for each block by minimizing the error $E(a_{k+1,k})$. The estimated block affine parameters sets for each block are then clustered to define the overall deformation for the next subimage relative to the current subimage.

In particular, as described above, each of the subimages is divided into blocks. In one exemplary embodiment, each of the subimages is divided into 8×8 pixel blocks. Each of these pixel blocks is then compared either to a corresponding one of the pixel blocks in another subimage based on their spatial locations or each block of one subimage is compared to all of the blocks of the other subimage, as set forth above with respect to FIGS. 8 and 10, respectively. For each set of compared blocks, a set $\bar{a}_i$ of block affine parameters is estimated using the least-squares estimation techniques described in Black.

As described above with respect to FIG. 9, the estimated block affine parameters sets $\bar{a}_i$ are clustered. The clusters are built by assigning any one set $\bar{a}_i$ of estimated block affine parameters as a first cluster center $\bar{a}_{c1}$. Then (k−1) more cluster centers are defined such that:

$$|\bar{a}_{ci} - \bar{a}_{cj}| > T_c. \tag{6}$$

That is, any one cluster center $\bar{a}_i$ must be at least a distance $T_c$ from each other cluster center $\bar{a}_j$. In particular, the (k−1) additional cluster centers are defined relative to the plotted first cluster center so that the initial k cluster centers are generally evenly distributed throughout the image. In general, this is guaranteed by using the distance threshold $T_c$ such that the next cluster center is at the distance $T_c$ from the previously-defined cluster centers. This ensures that at least one cluster center is from the overlapping area.

All of the remaining sets $\bar{a}_i$ of estimated block affine parameters are then assigned to one of the defined k clusters. In particular, the sets $\bar{a}_i$ of estimated block affine parameters are assigned to the k clusters by determining which cluster center $\bar{a}_{ck}$ is closest to each particular set $\bar{a}_i$ of estimated block affine parameters. Once all of the sets $\bar{a}_i$ of estimated block affine parameters are assigned to the k cluster centers, recentered cluster centers $\bar{a}_{ck'}$ are determined such that:

$$\bar{a}_{ck'} = \frac{1}{W} \sum_{j=1}^{W} \bar{a}_j, \tag{7}$$

where W is the number of elements in cluster k.

Once all of the cluster centers $\bar{a}_{ci}$ are recentered, the cluster centers $\bar{a}_{ci}$ are reviewed to determine if any two cluster centers $\bar{a}_{ci}$ are too close to each other. That is, for any two cluster centers $\bar{a}_{cl}$ and $\bar{a}_{cm}$, the clusters corresponding to these two cluster centers will be merged if:

$$|\bar{a}_{cl} - \bar{a}_{cm}| > T_m, \tag{8}$$

where $T_m$ is a merge threshold distance.

That is, the merge threshold distance $T_m$ defines the minimum distance that each separate cluster must have between its cluster center and the cluster center of each of the other clusters. If two clusters are not separated by at least the merge threshold distance $T_m$, then those clusters are not separate, and should be merged. The merge threshold distance $T_m$ may be adjusted to calibrate the system.

For each such pair of clusters that are merged, a new cluster center $\bar{a}_{clm}$ is determined as:

$$\bar{a}_{clm} = \frac{1}{W_1 + W_2} \sum_{j=1}^{W_1+W_2} \bar{a}_j, \tag{9}$$

where:

$W_1$ and $W_2$ are the number of elements in the clusters l and m, respectively, and $\bar{a}_j$ is a member of either cluster l or m.

The cluster n having the most elements is then identified. The center $\bar{a}_{cn}$ of this identified cluster n is then chosen as the set of image affine parameters for the next subimage relative to the current subimage.

Once all the non-base subimages generated from scanning the original document are warped into registration with the base subimage, the base and warped subimages are combined to form the composite image. Specifically, every image pixel in the, composite, or reconstructed original, image I(i,j) is determined by averaging, for the subimages in which that pixel occurs, the image values for that pixel in those subimages. Thus, the image value I(i,j) of a pixel (i,j) in the, composite, or reconstructed original, image is $$I(i,j) = [I_1(i,j) + I_2(i,j) + I_3(i,j) + \ldots I_N(i,j)]/N \tag{10}$$

where:

$I_k(i,j)$ is the image value of the pixel at location (i,j) in the $k^{th}$ subimage that contains the pixel (i,j); and N is the number of scanned subimages that contain the pixel (i,j). Thus, for any pixel (i,j), the averaging is only done over the particular subimages that overlap that pixel location. In general, there will usually be only one of the images that overlaps any particular pixel location, as the images generally overlap only by a little amount. For the pixel locations where two or more subimages overlap, there will generally only be two such subimages, and there will rarely be more than four such subimages. For example, in the subimages shown in FIGS. 13–15, most pixel locations are contained in only one subimage, most of the other pixel locations are contained in two subimages, the remaining pixel locations are contained in four subimages, and no pixel location is contained in more than four subimages.

As described above, the systems and methods of this invention produce composite, or reconstructed original, images that compare favorably with scanned images generated from complete scans of the original document, yet do not require scanning the original document using an oversized scanning area. The systems and methods of this invention are thus capable of producing high resolution composite scanned images of over-sized documents obtained from subimages obtained using a flatbed scanner, using relatively streamlined processing methods and achieving highly accurate image registration.

As shown in FIGS. 3–5, the scanned image registration system 200 is preferably implemented on a programmed general purpose computer. However, the scanned image registration system 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 6–12, can be used to implement the scanned image registration system 2000.

As shown in FIG. 3, the alterable portions of the memory 230 are preferably implemented using static or dynamic RAM. However, the alterable portions of the memory 230 can also be implemented using a floppy disk and disk drive, a writeable optical disk and disk drive, a hard drive, flash memory or the like.

As shown in FIG. 3, the non-volatile portions of the memory 230 is preferably implemented using a ROM. However, the non-volatile portions of the memory 230 can also be implemented using flash memory, CMOS memory, a PROM, an EEPROM, or a CD-ROM and disk drive or the like.

Further, it should be appreciated that the links 110 and 310 connecting the scanner 100 and the image data sink 300 to the scanned image registration system 200 can be a wired or wireless link to a network (not shown). The network can be a local area network, a wide area network, an intranet, the Internet, or any other distributed processing and storage network.

The foregoing description of the exemplary systems and methods for registering scanned subimages of this invention is illustrative, and variations in implementation will be apparent and predictable to persons skilled in the art. For example, while the systems and methods of this invention have been described with reference to desktop-scanned images, any other type of image sensing device requiring accurate registration of a sequence of images can be used in conjunction with the systems and methods of this invention, such as portions of satellite or robotic images.

Thus, while the systems and methods of this invention has been described in conjunction with the specific embodiments outlined above, it is evident that many alternatives, modifications and variations will be apparent to those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. A system for forming a composite image from a plurality of overlapping subimages, each subimage having a plurality of pixels, comprising:
   a memory, the plurality of subimages storable in the memory;
   a subimage blocking circuit inputting each of the plurality of subimages and dividing each subimage into a plurality of blocks;
   a transformation parameter generating circuit, comprising:
      a block comparing circuit,
      a block transformation parameter set estimating circuit,
      a cluster generating circuit,
      a subimage transformation parameter set generating circuit, and
      a subimage transformation parameter revising circuit;
   a subimage warping circuit; and
   a subimage combining circuit.

2. A system for forming a composite image from a plurality of overlapping subimages, each subimage having a plurality of pixels, comprising:
   a memory, the plurality of subimages storable in the memory;
   a subimage blocking circuit operatively arranged to divide each subimage into plural blocks;
   a transformation parameter generating circuit, comprising:
      a block comparing circuit,
      a block transformation parameter set estimating circuit,
      a cluster generating circuit,
      a subimage transformation parameter set generating circuit, and
      a subimage transformation parameter revising circuit;
   a subimage warping circuit; and
   a subimage combining circuit,
   wherein the block comparing circuit compares each block of a first subimage against each block of a second subimage.

3. The system of claim 2, wherein the transformation parameter generating circuit inputs pairs of the plurality of subimages and generates a set of transformation parameters that is representative of a deformation of one subimage of the pair of subimages relative to at least the other subimage of the pair of subimages.

4. The system of claim 3, wherein the set of transformation parameters further represent a deformation of the one subimage relative to a fixed coordinate system.

5. The system of claim 4, wherein the fixed coordinate system is defined by a base one of the plurality of subimages.

6. The system of claim 3, wherein the subimage warping circuits warps at least one of the plurality of subimages relative to a selected one of the plurality of subimages based on the corresponding set of transformation parameters generated by the transformation parameter generating circuit.

7. The system of claim 6, wherein the subimage combining circuit combines the at least one warped subimage and the selected subimage to form a composite image.

8. The system of claim 2, wherein the block transformation parameter set estimating circuit generates, for each pair of blocks compared by the block comparing circuit, the pair of blocks comprising a first block of a first subimage and a second block of a second subimage, a set of block transformation parameters representative of a deformation of one block relative to the other block.

9. The system of claim 2, wherein the clusters generating circuit generates, from sets of block transformation parameters generated by the block transformation parameter set estimating circuit, a plurality of clusters of the sets.

10. The system of claim 2, wherein the subimage transformation parameter set generating circuit generates, based on a plurality of clusters of sets of transformation parameters generated by the clusters generating circuit, a set of image transformation parameters representative of a deformation of a first subimage relative to a second subimage.

11. The system of claim 2, wherein the subimage transformation parameter set revising circuit changes a set of image transformation parameters generated by the subimage transformation parameter set generating circuit, the set of image transformation parameters representative of a deformation of a first subimage relative to a second subimage, based on a set of transformation parameters representative of a deformation of the second subimage relative to a fixed coordinate system.

12. The system of claim 2, wherein the transformation parameter generating circuit generates affine parameters.

13. A system for forming a composite image from a plurality of overlapping subimages, each subimage having a plurality of pixels, comprising:
   a memory, the plurality of subimages storable in the memory;
   a subimage blocking circuit operatively arranged to divide each overlapping subimage into plural blocks;
   a transformation parameter generating circuit, comprising:
      a block comparing circuit operatively arranged to compare each block of a first overlapping subimage against each block of a second overlapping subimage,
      a block transformation parameter set estimating circuit,
      a cluster generating circuit;
      a subimage transformation parameter set generating circuit, and
      a subimage transformation parameter revising circuit;
   a subimage warping circuit; and
   a subimage combining circuit.

14. The system of claim 13, where the original document is scanned by a scanner, a window of the scanner being smaller than a size of the original document.

15. An apparatus that forms a composite image from a plurality of overlapping subimages, each overlapping subimage having at least one overlapping subimage region having pixels with image values, the apparatus comprising:
   a first buffer capable of storing a current subimage and a next subimage;
   a transformation parameter estimating unit, a transformation parameter addition unit;

a warper;

a second buffer capable of storing a first one of the plurality of overlapping images and warped versions of other ones of the plurality of overlapping images; and a mean filter operatively arranged to average only over image values for corresponding pixels in the overlapping subimage regions.

16. A scanning device, comprising:

an image capture device; and the apparatus of claim 15, wherein the plurality of overlapping subimages are generated from an original document using the image capture device.

17. A method for forming a composite image from a plurality of overlapping subimages, each subimage having a plurality of pixels, comprising:

dividing each subimage into a plurality of blocks;

selecting at least one pair of the plurality of subimages;

determining, for each selected pair of subimages a set of image transformation parameters representative of at least a deformation of a first one of that pair of subimages relative to a fixed coordinate system, comprising:

comparing, for each block of the first selected subimage, that block to at least one block in a second one of the pair of selected subimage, determining a set of block transformation parameters for each pair of compared blocks of the first and second subimages, generating a plurality of clusters of the determined set of block transformation parameters, determining a set of image transformation parameters for the first subimage relative to the second subimage based on the generated clusters, and modifying the determined set of image transformation parameters for the first subimage based on a set of image transformation parameters for the second subimage relative to the fixed coordinate set;

warping, for each subimage having a corresponding set of image transformation parameters, that subimage into the fixed coordinate system based on the corresponding set of image transformation parameters; and combining the plurality of subimages to form the composite image.

18. The method of claim 17, wherein the fixed coordinate system is defined by a base one of the plurality of subimages.

19. The method of claim 17, wherein comparing each block of the first selected subimage to at least one block in the second selected subimages comprises comparing each block of the first selected subimage to a corresponding block of the second selected subimage.

20. The method of claim 17, wherein comparing each block of the first selected subimage to at least one block in the second selected subimages comprises comparing each block of the first selected subimage to each block of the second selected subimage.

21. The method of claim 17, wherein selecting the at least one pair of the plurality of subimages comprises:

selecting a current subimage;

determining each next subimage that overlaps the current subimage; and forming, for each next subimage, a pair of the subimages comprising that next subimage and the current subimage.

22. The method of claim 21, wherein each next subimage is determined based on a scanning order of the subimages.

23. The method of claim 21, wherein each next subimage is determined based on data associated with the plurality of subimages.

24. The method of claim 23, wherein the data associated with the plurality of subimages is supplied by a user.

25. The method of claim 24, wherein the data associated with the plurality of subimages is supplied by the user in response to the user scanning an original document to obtain the subimages.

26. The method of claim 23, wherein the data indicates which subimages overlap which other overlapping subimages.

27. The method of claim 17, wherein selecting the at least one pair of the plurality of subimages comprises:

selecting a current subimage;

selecting an unwarped subimage; and forming a pair of the subimages comprising the current subimage and the selected unwarped subimage; and repeating the unwarped subimage selecting and forming steps for each unselected unwarped subimage.

28. The method of claim 27, wherein selecting the current subimage comprises selecting one of a base subimage used to define the fixed coordinate system and a previously warped subimage.

29. The method of claim 17, further comprising obtaining the plurality of subimages by scanning an original document.

30. The method of claim 29, wherein scanning the original document comprises scanning the original document with a scanning device that has a scanning window smaller than a size of the original document.

31. The method of claim 17, wherein determining the set of image transformation parameters comprises determining a set of image affine parameters.

32. A method for forming a composite image from a plurality of overlapping subimages, each subimage having a plurality of pixels, comprising:

dividing each subimage into a plurality of blocks;

selecting at least one pair of plurality of subimages;

determining, for each selected pair of subimages a set of image transformation parameters representative of at least a deformation of a first one of that pair of subimages relative to a fixed coordinate system, comprising:

selecting a subset of the blocks in a first one of the pair of selected subimages, comparing, for each block of the selected subset of the first selected subimage, that block to a plurality of blocks in a second one of the pair of selected subimages, determining a set of block transformation parameters for each pair of compared blocks of the first and second subimages, determining an offset value for the blocks of the first subimage relative to the blocks of the second subimage based on the determined sets of block transformation parameters, determining, for each block of the first selected subimage, a corresponding block of the second selected subimage that corresponds to that block based on the determined offset value, comparing, for each block of the first selected subimage, that block to the corresponding block of the second selected subimage, determining a second set of block transformation parameters for each pair of compared blocks of the first and second subimages, generating a plurality of clusters of the determined second sets of block transformation parameters, determining a set of image transformation parameters for the first subimage relative to the second subimage based on the generated plurality of clusters, and modifying the determined set of image transformation parameters for the first subimage based on a set of image transformation parameters for the second subimage relative to the fixed coordinate set; and warping, for each subimage having a corresponding set of image transformation parameters, that subimage into the fixed coordinate system based on the corresponding set of image transformation parameters; and combining the plurality of subimages to form the composite image.

33. A system for forming a composite image from plural overlapping subimages, comprising:

a subimage blocking circuit operatively arranged to divide each overlapping subimage into plural blocks, each block having plural pixels, each pixel having an image value;

a transformation parameter generating circuit operatively connected to the blocking circuit and including at least:

a block comparing circuit operatively arranged to compare image values of pixels in at least one block of a first overlapping subimage against image values of pixels in a block of a second overlapping subimage, a block transformation parameter set estimating circuit operatively connected to the block comparing circuit and arranged to estimate block transformation parameters for the compared blocks, a cluster generating circuit operatively connected to the block transformation parameter estimating circuit and arranged to choose a block transformation parameter set based on the estimated block transformation parameters, and a subimage transformation parameter set generating circuit operatively connected to the cluster generating circuit and arranged to generate subimage transformation parameters based on the chosen block transformation set, and a subimage combining circuit operatively arranged to combine subimages based on the generated subimage transformation parameters.

34. The system according to claim 33 further comprising a subimage warping circuit operatively arranged to modify at least one of the plural subimages based on the generated subimage transformation parameters.

35. The system according to claim 33 further comprising a mean filter operatively arranged to average over image values for corresponding pixels in the overlapping subimages.

* * * * *